United States Patent
Lee et al.

(10) Patent No.: US 10,683,237 B2
(45) Date of Patent: Jun. 16, 2020

(54) SYSTEM AND METHOD OF APPLYING CARBON DIOXIDE DURING THE PRODUCTION OF CONCRETE

(71) Applicant: CarbonCure Technologies Inc., Dartmouth (CA)

(72) Inventors: Michael Lee, Colorado Springs, CO (US); Eric Alan Burton, Palmer Lake, CO (US)

(73) Assignee: CarbonCure Technologies Inc., Dartmouth, NS (CA)

( * ) Notice: Subject to any disclaimer, the term of this patent is extended or adjusted under 35 U.S.C. 154(b) by 117 days.

(21) Appl. No.: 15/828,240

(22) Filed: Nov. 30, 2017

(65) Prior Publication Data
US 2018/0258000 A1   Sep. 13, 2018

Related U.S. Application Data

(63) Continuation of application No. 14/171,350, filed on Feb. 3, 2014, now abandoned.
(Continued)

(51) Int. Cl.
*C04B 40/00* (2006.01)
*B28C 5/00* (2006.01)
(Continued)

(52) U.S. Cl.
CPC ............ *C04B 40/0032* (2013.01); *B01F 3/06* (2013.01); *B01F 3/18* (2013.01); *B01F 5/04* (2013.01);
(Continued)

(58) Field of Classification Search
CPC ............ B01F 5/0465; B01F 15/00422; B01F 15/0243; B01F 15/0261; B01F 2003/049; B01F 2003/04921; B01F 2005/0034; B01F 2215/0022; B67D 1/0058; B67D 1/0069; B67D 1/007; A23V 2002/00
See application file for complete search history.

(56) References Cited

U.S. PATENT DOCUMENTS

| 128,980 A | 7/1872 | Rowland |
| 170,594 A | 11/1875 | Richardson |

(Continued)

FOREIGN PATENT DOCUMENTS

| AU | 2397377 A | 10/1978 |
| AU | 504446 B2 | 10/1979 |

(Continued)

OTHER PUBLICATIONS

Cornerstone Custom Concrete, LLC. "How Much Does Concrete Weigh?" Retrieved Jul. 15, 2019. <web.archive.org/web/20130124160823/http://www.minneapolis-concrete.com/how-much-does-concrete-weigh.html>. p. 1. (Year: 2013).*

(Continued)

*Primary Examiner* — Anshu Bhatia
(74) *Attorney, Agent, or Firm* — Storella & Witt, LLP

(57) ABSTRACT

The present disclosure involves systems and methods for applying CO2 to concrete, which may be performed in-situ or through a separate, stand-alone process. According to another embodiment disclosed herein, a system and method for applying CO2 to one or more materials used in the production of concrete is also provided.

6 Claims, 5 Drawing Sheets

Related U.S. Application Data

(60) Provisional application No. 61/760,319, filed on Feb. 4, 2013.

(51) Int. Cl.

| | | |
|---|---|---|
| *B28C 5/46* | (2006.01) | |
| *F25B 19/00* | (2006.01) | |
| *C04B 22/10* | (2006.01) | |
| *C04B 28/02* | (2006.01) | |
| *B28C 7/04* | (2006.01) | |
| *B01F 3/06* | (2006.01) | |
| *B01F 3/18* | (2006.01) | |
| *B01F 5/04* | (2006.01) | |
| *B01F 15/00* | (2006.01) | |
| *B01F 15/06* | (2006.01) | |
| *C04B 40/02* | (2006.01) | |

(52) U.S. Cl.
CPC ...... *B01F 15/00344* (2013.01); *B01F 15/063* (2013.01); *B28C 5/462* (2013.01); *B28C 5/468* (2013.01); *B28C 7/0418* (2013.01); *C04B 22/10* (2013.01); *C04B 28/02* (2013.01); *C04B 40/0231* (2013.01); *F25B 19/005* (2013.01); *B01F 2015/061* (2013.01); *B01F 2215/0047* (2013.01); *Y02P 40/18* (2015.11)

(56) References Cited

U.S. PATENT DOCUMENTS

| | | |
|---|---|---|
| 461,888 A | 10/1891 | Richardson |
| 1,932,150 A | 10/1933 | Tada |
| 2,254,016 A | 8/1941 | Melton et al. |
| 2,259,830 A | 10/1941 | Osborne |
| 2,329,940 A | 9/1943 | Ponzer |
| 2,496,895 A | 2/1950 | Staley |
| 2,498,513 A | 2/1950 | Cuypers |
| 2,603,352 A | 7/1952 | Tromp |
| 3,002,248 A | 10/1961 | Willson |
| 3,184,037 A | 5/1965 | Greaves et al. |
| 3,356,779 A | 12/1967 | Schulze |
| 3,358,342 A | 12/1967 | Spence |
| 3,442,498 A | 5/1969 | Noah |
| 3,468,993 A | 9/1969 | Knud |
| 3,492,385 A | 1/1970 | Branko |
| 3,667,242 A | 6/1972 | Kilburn |
| 3,752,314 A | 8/1973 | Brown et al. |
| 3,757,631 A | 9/1973 | McManus et al. |
| 3,917,236 A | 11/1975 | Hanson |
| 3,957,203 A | 5/1976 | Bullard |
| 4,068,755 A | 1/1978 | Parkes et al. |
| 4,069,063 A | 1/1978 | Ball |
| 4,076,782 A | 2/1978 | Yazawa et al. |
| 4,093,690 A | 6/1978 | Murray |
| 4,117,060 A | 9/1978 | Murray |
| 4,257,710 A | 3/1981 | Delcoigne et al. |
| 4,266,921 A | 5/1981 | Murray |
| 4,275,836 A | 6/1981 | Egger |
| 4,350,567 A | 9/1982 | Moorehead et al. |
| 4,362,679 A | 12/1982 | Malinowski |
| 4,420,868 A | 12/1983 | McEwen et al. |
| 4,427,610 A | 1/1984 | Murray |
| 4,436,498 A | 3/1984 | Murray |
| 4,526,534 A | 7/1985 | Wollmann |
| 4,588,299 A | 5/1986 | Brown et al. |
| 4,613,472 A | 9/1986 | Svanholm |
| 4,746,481 A | 5/1988 | Schmidt |
| 4,772,439 A | 9/1988 | Trevino-Gonzalez |
| 4,789,244 A | 12/1988 | Dunton et al. |
| 4,846,580 A | 7/1989 | Oury |
| 4,881,347 A | 11/1989 | Mario et al. |
| 4,917,587 A | 4/1990 | Alpar et al. |
| 4,944,595 A | 7/1990 | Hodson |
| 5,051,217 A | 9/1991 | Alpar et al. |
| 5,158,996 A | 10/1992 | Valenti |
| 5,162,402 A | 11/1992 | Ogawa et al. |
| 5,203,919 A | 4/1993 | Bobrowski et al. |
| 5,220,732 A | 6/1993 | Lee |
| 5,232,496 A | 8/1993 | Jennings et al. |
| 5,244,498 A | 9/1993 | Steinke |
| 5,257,464 A | 11/1993 | Trevino-Gonzales |
| 5,298,475 A | 3/1994 | Shibata et al. |
| 5,352,035 A | 10/1994 | Macaulay et al. |
| 5,356,579 A | 10/1994 | Jennings et al. |
| 5,358,566 A | 10/1994 | Tanaka et al. |
| 5,360,660 A | 11/1994 | Nohlgren |
| 5,393,343 A | 2/1995 | Darwin et al. |
| 5,427,617 A | 6/1995 | Bobrowski et al. |
| 5,451,104 A | 9/1995 | Kleen et al. |
| 5,453,123 A | 9/1995 | Burge et al. |
| 5,458,470 A | 10/1995 | Mannhart et al. |
| 5,494,516 A | 2/1996 | Drs et al. |
| 5,505,987 A | 4/1996 | Jennings et al. |
| 5,518,540 A | 5/1996 | Jones, Jr. |
| 5,583,183 A | 12/1996 | Darwin et al. |
| 5,609,681 A | 3/1997 | Drs et al. |
| 5,612,396 A | 3/1997 | Valenti et al. |
| 5,624,493 A | 4/1997 | Wagh et al. |
| 5,633,298 A | 5/1997 | Arfaei et al. |
| 5,643,978 A | 7/1997 | Darwin et al. |
| 5,650,562 A | 7/1997 | Jones, Jr. |
| 5,660,626 A | 8/1997 | Ohta et al. |
| 5,661,206 A | 8/1997 | Tanaka et al. |
| 5,665,158 A | 9/1997 | Darwin et al. |
| 5,667,298 A | 9/1997 | Musil et al. |
| 5,668,195 A | 9/1997 | Leikauf |
| 5,669,968 A | 9/1997 | Kobori et al. |
| 5,674,929 A | 10/1997 | Melbye |
| 5,676,905 A | 10/1997 | Andersen et al. |
| 5,690,729 A | 11/1997 | Jones, Jr. |
| 5,703,174 A | 12/1997 | Arfaei et al. |
| 5,725,657 A | 3/1998 | Darwin et al. |
| 5,728,207 A | 3/1998 | Arfaei et al. |
| 5,744,078 A | 4/1998 | Soroushian et al. |
| 5,752,768 A | 5/1998 | Assh |
| 5,753,744 A | 5/1998 | Darwin et al. |
| 5,798,425 A | 8/1998 | Albrecht et al. |
| 5,800,752 A | 9/1998 | Charlebois |
| 5,804,175 A | 9/1998 | Ronin et al. |
| 5,840,114 A | 11/1998 | Jeknavorian et al. |
| 5,873,653 A | 2/1999 | Paetzold |
| 5,882,190 A | 3/1999 | Doumet |
| 5,885,478 A | 3/1999 | Montgomery et al. |
| 5,912,284 A | 6/1999 | Hirata et al. |
| 5,935,317 A | 8/1999 | Soroushian et al. |
| 5,947,600 A | 9/1999 | Maeda et al. |
| 5,965,201 A | 10/1999 | Jones, Jr. |
| 6,008,275 A | 12/1999 | Moreau et al. |
| 6,042,258 A | 3/2000 | Hines et al. |
| 6,042,259 A | 3/2000 | Hines et al. |
| 6,063,184 A | 5/2000 | Leikauf et al. |
| 6,066,262 A | 5/2000 | Montgomery et al. |
| 6,113,684 A | 9/2000 | Kunbargi |
| 6,136,950 A | 10/2000 | Vickers, Jr. et al. |
| 6,187,841 B1 | 2/2001 | Tanaka et al. |
| 6,264,736 B1 | 7/2001 | Knopf et al. |
| 6,267,814 B1 | 7/2001 | Bury et al. |
| 6,284,867 B1 | 9/2001 | Vickers, Jr. et al. |
| 6,290,770 B1 | 9/2001 | Moreau et al. |
| 6,310,143 B1 | 10/2001 | Vickers, Jr. et al. |
| 6,318,193 B1 | 11/2001 | Brock et al. |
| 6,334,895 B1 | 1/2002 | Bland |
| 6,372,157 B1 | 4/2002 | Krill, Jr. et al. |
| 6,387,174 B2 | 5/2002 | Knopf et al. |
| 6,451,105 B1 | 9/2002 | Turpin, Jr. |
| 6,463,958 B1 | 10/2002 | Schwing |
| 6,517,631 B1 | 2/2003 | Bland |
| 6,648,551 B1 | 11/2003 | Taylor |
| 6,682,655 B2 | 1/2004 | Beckham et al. |
| 6,871,667 B2 | 3/2005 | Schwing et al. |
| 6,890,497 B2 | 5/2005 | Rau et al. |
| 6,936,098 B2 | 8/2005 | Ronin |
| 6,960,311 B1 | 11/2005 | Mirsky et al. |

(56) References Cited

U.S. PATENT DOCUMENTS

| | | |
|---|---|---|
| 6,997,045 B2 | 2/2006 | Wallevik et al. |
| 7,003,965 B2 | 2/2006 | Auer et al. |
| 7,201,018 B2 | 4/2007 | Gershtein et al. |
| 7,390,444 B2 | 6/2008 | Ramme et al. |
| 7,399,378 B2 | 7/2008 | Edwards et al. |
| 7,419,051 B2 | 9/2008 | Damkjaer et al. |
| 7,549,493 B1 | 6/2009 | Jones |
| 7,588,661 B2 | 9/2009 | Edwards et al. |
| 7,635,434 B2 | 12/2009 | Mickelson et al. |
| 7,704,349 B2 | 4/2010 | Edwards et al. |
| 7,735,274 B2 | 6/2010 | Constantz et al. |
| 7,736,430 B2 | 6/2010 | Barron et al. |
| 7,771,684 B2 | 8/2010 | Constantz et al. |
| 7,815,880 B2 | 10/2010 | Constantz et al. |
| 7,879,146 B2 | 2/2011 | Raki et al. |
| 7,906,086 B2 | 3/2011 | Comrie |
| 7,914,685 B2 | 3/2011 | Constantz et al. |
| 7,922,809 B1 | 4/2011 | Constantz et al. |
| 7,950,841 B2 | 5/2011 | Klein et al. |
| 8,006,446 B2 | 8/2011 | Constantz et al. |
| 8,043,426 B2 | 10/2011 | Mohamed et al. |
| 8,105,558 B2 | 1/2012 | Comrie |
| 8,114,214 B2 | 2/2012 | Constantz et al. |
| 8,114,367 B2 | 2/2012 | Riman et al. |
| 8,118,473 B2 | 2/2012 | Cooley et al. |
| 8,137,455 B1 | 3/2012 | Constantz et al. |
| 8,157,009 B2 | 4/2012 | Patil et al. |
| 8,177,909 B2 | 5/2012 | Constantz et al. |
| 8,192,542 B2 | 6/2012 | Virtanen |
| 8,235,576 B2 | 8/2012 | Klein et al. |
| 8,272,205 B2 | 9/2012 | Estes et al. |
| 8,287,173 B2 | 10/2012 | Khouri |
| 8,311,678 B2 | 11/2012 | Koehler et al. |
| 8,313,802 B2 | 11/2012 | Riman et al. |
| 8,333,944 B2 | 12/2012 | Constantz et al. |
| 8,470,275 B2 | 6/2013 | Constantz et al. |
| 8,491,858 B2 | 7/2013 | Seeker et al. |
| 8,518,176 B2 | 8/2013 | Silva et al. |
| 8,584,864 B2 | 11/2013 | Lee et al. |
| 8,708,547 B2 | 4/2014 | Bilger |
| 8,709,960 B2 | 4/2014 | Riman et al. |
| 8,721,784 B2 | 5/2014 | Riman et al. |
| 8,746,954 B2 | 6/2014 | Cooley et al. |
| 8,845,940 B2 | 9/2014 | Niven et al. |
| 8,989,905 B2 | 3/2015 | Sostaric et al. |
| 9,061,940 B2 | 6/2015 | Chen et al. |
| 9,108,803 B2 | 8/2015 | Till |
| 9,108,883 B2 | 8/2015 | Forgeron et al. |
| 9,376,345 B2 | 6/2016 | Forgeron et al. |
| 9,388,072 B2 | 7/2016 | Niven et al. |
| 9,448,094 B2 | 9/2016 | Downie et al. |
| 9,463,580 B2 | 10/2016 | Forgeron et al. |
| 9,492,945 B2 | 11/2016 | Niven et al. |
| 9,738,562 B2 | 8/2017 | Monkman et al. |
| 9,758,437 B2 | 9/2017 | Forgeron et al. |
| 9,790,131 B2 | 10/2017 | Lee et al. |
| 2002/0019459 A1 | 2/2002 | Albrecht et al. |
| 2002/0047225 A1 | 4/2002 | Bruning et al. |
| 2002/0179119 A1 | 12/2002 | Harmon |
| 2003/0122273 A1 | 7/2003 | Fifield |
| 2005/0131600 A1 | 6/2005 | Quigley et al. |
| 2005/0219939 A1 | 10/2005 | Christenson et al. |
| 2007/0170119 A1 | 7/2007 | Mickelson et al. |
| 2007/0171764 A1 | 7/2007 | Klein et al. |
| 2007/0185636 A1 | 8/2007 | Cooley et al. |
| 2007/0215353 A1 | 9/2007 | Barron et al. |
| 2008/0092957 A1 | 4/2008 | Rosaen |
| 2008/0174041 A1 | 7/2008 | Firedman et al. |
| 2008/0202389 A1 | 8/2008 | Hojaji et al. |
| 2008/0245274 A1 | 10/2008 | Ramme |
| 2008/0308133 A1 | 12/2008 | Grubb et al. |
| 2008/0316856 A1 | 12/2008 | Cooley et al. |
| 2009/0093328 A1 | 4/2009 | Dickinger et al. |
| 2009/0103392 A1 | 4/2009 | Bilger |
| 2009/0143211 A1 | 6/2009 | Riman et al. |
| 2009/0292572 A1 | 11/2009 | Alden et al. |
| 2009/0294079 A1 | 12/2009 | Edwards et al. |
| 2010/0132556 A1 | 6/2010 | Constantz et al. |
| 2010/0239487 A1 | 9/2010 | Constantz et al. |
| 2010/0246312 A1 | 9/2010 | Welker et al. |
| 2011/0023659 A1 | 2/2011 | Nguyen et al. |
| 2011/0067600 A1 | 3/2011 | Constantz et al. |
| 2011/0165400 A1 | 7/2011 | Quaghebeur et al. |
| 2011/0198369 A1 | 8/2011 | Klein et al. |
| 2011/0249527 A1 | 10/2011 | Seiler et al. |
| 2011/0262328 A1 | 10/2011 | Wijmans et al. |
| 2011/0289901 A1 | 12/2011 | Estes et al. |
| 2011/0320040 A1 | 12/2011 | Koehler et al. |
| 2012/0238006 A1 | 9/2012 | Gartner et al. |
| 2012/0312194 A1 | 12/2012 | Riman et al. |
| 2013/0025317 A1 | 1/2013 | Terrien et al. |
| 2013/0036945 A1 | 2/2013 | Constantz et al. |
| 2013/0122267 A1 | 5/2013 | Riman et al. |
| 2013/0125791 A1 | 5/2013 | Fried et al. |
| 2013/0139727 A1 | 6/2013 | Constantz et al. |
| 2013/0167756 A1 | 7/2013 | Chen et al. |
| 2013/0284073 A1 | 10/2013 | Gartner |
| 2013/0305963 A1 | 11/2013 | Fridman |
| 2014/0034452 A1 | 2/2014 | Lee et al. |
| 2014/0050611 A1 | 2/2014 | Warren et al. |
| 2014/0069302 A1 | 3/2014 | Saastamoinen et al. |
| 2014/0083514 A1 | 3/2014 | Ding |
| 2014/0090415 A1 | 4/2014 | Reddy et al. |
| 2014/0096704 A1 | 4/2014 | Rademan et al. |
| 2014/0104972 A1 | 4/2014 | Roberts et al. |
| 2014/0107844 A1 | 4/2014 | Koehler et al. |
| 2014/0116295 A1 | 5/2014 | Niven et al. |
| 2014/0127450 A1 | 5/2014 | Riman et al. |
| 2014/0197563 A1 | 7/2014 | Niven et al. |
| 2014/0208782 A1 | 7/2014 | Joensson et al. |
| 2014/0216303 A1 | 8/2014 | Lee et al. |
| 2014/0327168 A1 | 11/2014 | Niven et al. |
| 2014/0373755 A1 | 12/2014 | Forgeron et al. |
| 2015/0023127 A1 | 1/2015 | Chon et al. |
| 2015/0069656 A1 | 3/2015 | Bowers et al. |
| 2015/0197447 A1 | 7/2015 | Forgeron et al. |
| 2015/0202579 A1 | 7/2015 | Richardson et al. |
| 2015/0232381 A1 | 8/2015 | Niven et al. |
| 2015/0247212 A1 | 9/2015 | Sakaguchi et al. |
| 2015/0298351 A1 | 10/2015 | Beaupré |
| 2015/0355049 A1 | 12/2015 | Ait et al. |
| 2016/0001462 A1 | 1/2016 | Forgeron et al. |
| 2016/0107939 A1 | 4/2016 | Monkman et al. |
| 2016/0185662 A9 | 6/2016 | Niven et al. |
| 2016/0272542 A1 | 9/2016 | Monkman et al. |
| 2016/0280610 A1 | 9/2016 | Forgeron et al. |
| 2016/0340253 A1 | 11/2016 | Forgeron et al. |
| 2016/0355441 A1 | 12/2016 | Tregger et al. |
| 2016/0355442 A1 | 12/2016 | Niven et al. |
| 2017/0015598 A1 | 1/2017 | Monkman et al. |
| 2017/0028586 A1 | 2/2017 | Jordan et al. |
| 2017/0036372 A1 | 2/2017 | Sandberg et al. |
| 2017/0043499 A1 | 2/2017 | Forgeron et al. |
| 2017/0158549 A1 | 6/2017 | Yamada et al. |
| 2017/0158569 A1 | 6/2017 | Lee et al. |
| 2017/0165870 A1 | 6/2017 | Niven et al. |
| 2017/0217047 A1 | 8/2017 | Leon et al. |
| 2018/0022654 A1 | 1/2018 | Forgeron et al. |

FOREIGN PATENT DOCUMENTS

| | | |
|---|---|---|
| CA | 970935 A1 | 7/1975 |
| CA | 1045073 A | 12/1978 |
| CA | 1185078 A1 | 4/1985 |
| CA | 2027216 A1 | 4/1991 |
| CA | 2343021 A1 | 3/2000 |
| CA | 2362631 A1 | 8/2000 |
| CA | 2598583 A1 | 9/2006 |
| CA | 2646462 A1 | 9/2007 |
| CA | 2630226 A1 | 10/2008 |
| CA | 2659447 A1 | 12/2008 |
| CA | 2703343 A1 | 4/2009 |
| CA | 2705857 A1 | 5/2009 |
| CA | 2670049 A1 | 11/2009 |

(56) References Cited

FOREIGN PATENT DOCUMENTS

| | | |
|---|---|---|
| CA | 2668249 A1 | 12/2009 |
| CA | 2778508 A1 | 6/2011 |
| CA | 2785143 A1 | 7/2011 |
| CA | 2501329 C | 6/2012 |
| CA | 2829320 A1 | 9/2012 |
| CA | 2837832 A1 | 12/2012 |
| CN | 2055815 U | 4/1990 |
| CN | 1114007 A | 12/1995 |
| CN | 1267632 A | 9/2000 |
| CN | 2445047 Y | 8/2001 |
| CN | 1357506 A | 7/2002 |
| CN | 2575406 Y | 9/2003 |
| CN | 2700294 Y | 5/2005 |
| CN | 2702958 Y | 6/2005 |
| CN | 2748574 Y | 12/2005 |
| CN | 1735468 A | 2/2006 |
| CN | 1916332 A | 2/2007 |
| CN | 2893360 Y | 4/2007 |
| CN | 2913278 Y | 6/2007 |
| CN | 200961340 Y | 10/2007 |
| CN | 101099596 A | 1/2008 |
| CN | 101319512 A | 12/2008 |
| CN | 101538813 A | 9/2009 |
| CN | 101551001 A | 10/2009 |
| CN | 201325866 Y | 10/2009 |
| DE | 1817001 A1 | 11/1970 |
| DE | 3139107 A1 | 4/1983 |
| DE | 19506411 A1 | 8/1996 |
| DE | 20305552 U1 | 10/2003 |
| EP | 0047675 A1 | 3/1982 |
| EP | 0218189 A2 | 4/1987 |
| EP | 0151164 B1 | 5/1988 |
| EP | 0218189 A3 | 5/1988 |
| EP | 0629597 A1 | 12/1994 |
| EP | 0573524 B1 | 5/1996 |
| EP | 0701503 B1 | 8/2000 |
| EP | 1429096 A2 | 6/2004 |
| EP | 1785245 A1 | 5/2007 |
| EP | 2012149 A1 | 1/2009 |
| EP | 2012150 A1 | 1/2009 |
| EP | 2039589 A1 | 3/2009 |
| EP | 2040135 A2 | 3/2009 |
| EP | 2042326 A2 | 4/2009 |
| EP | 2043169 A2 | 4/2009 |
| EP | 2048525 A1 | 4/2009 |
| EP | 2096498 A1 | 9/2009 |
| EP | 2098362 A1 | 9/2009 |
| EP | 2116841 A1 | 11/2009 |
| EP | 2123700 A1 | 11/2009 |
| EP | 2123942 B1 | 4/2011 |
| EP | 2123465 B1 | 7/2011 |
| EP | 2042317 B1 | 8/2011 |
| EP | 2162639 B1 | 9/2011 |
| EP | 2162640 B1 | 9/2011 |
| EP | 2042535 B1 | 10/2011 |
| EP | 2042324 B1 | 6/2012 |
| EP | 2039393 B1 | 8/2012 |
| EP | 1749629 B1 | 5/2013 |
| EP | 2123441 B1 | 7/2013 |
| EP | 2107000 B1 | 9/2013 |
| EP | 2031010 B1 | 4/2014 |
| EP | 2123808 B1 | 5/2014 |
| EP | 2036952 B1 | 4/2016 |
| EP | 3013544 A1 | 5/2016 |
| EP | 2387551 B1 | 7/2016 |
| EP | 1985754 B1 | 8/2016 |
| ES | 2140302 A1 | 2/2000 |
| FR | 1259819 A | 4/1961 |
| FR | 2121975 A5 | 8/1972 |
| FR | 2281815 A1 | 3/1976 |
| FR | 2503135 A1 | 10/1982 |
| FR | 2513932 A1 | 4/1983 |
| FR | 2735804 A1 | 12/1996 |
| GB | 217791 A | 6/1924 |
| GB | 574724 A | 1/1946 |
| GB | 644615 A | 10/1950 |
| GB | 851222 A | 10/1960 |
| GB | 1167927 A | 10/1969 |
| GB | 1199069 A | 7/1970 |
| GB | 1337014 A | 11/1973 |
| GB | 1460284 A | 12/1976 |
| GB | 1549633 A | 8/1979 |
| GB | 2106886 A | 4/1983 |
| GB | 2192392 A | 1/1988 |
| GB | 2300631 A | 11/1996 |
| GB | 2302090 A | 1/1997 |
| GB | 2392502 A | 3/2004 |
| GB | 2467005 A | 7/2010 |
| JP | S56115423 A | 9/1981 |
| JP | S5850197 A | 3/1983 |
| JP | S60187354 A | 9/1985 |
| JP | S6150654 A | 3/1986 |
| JP | S62122710 A | 6/1987 |
| JP | S6426403 A | 1/1989 |
| JP | H0218368 A | 1/1990 |
| JP | H0254504 U | 4/1990 |
| JP | H05116135 A | 5/1993 |
| JP | H05117012 A | 5/1993 |
| JP | H0624329 A | 2/1994 |
| JP | H06144944 A | 5/1994 |
| JP | H06263562 A | 9/1994 |
| JP | H0748186 A | 2/1995 |
| JP | H07275899 A | 10/1995 |
| JP | H0835281 A | 2/1996 |
| JP | H0960103 A | 3/1997 |
| JP | H09124099 A | 5/1997 |
| JP | H10194798 A | 7/1998 |
| JP | H11303398 A | 11/1999 |
| JP | H11324324 A | 11/1999 |
| JP | 2000203964 A | 7/2000 |
| JP | 2000247711 A | 9/2000 |
| JP | 2000281467 A | 10/2000 |
| JP | 2002012480 A | 1/2002 |
| JP | 2002127122 A | 5/2002 |
| JP | 2003326232 A | 11/2003 |
| JP | 2005023692 A | 1/2005 |
| JP | 2005273720 A | 10/2005 |
| JP | 2007326881 A | 12/2007 |
| JP | 2008096409 A | 4/2008 |
| JP | 2009115209 A | 5/2009 |
| JP | 4313352 B2 | 8/2009 |
| KR | 20020006222 A | 1/2002 |
| KR | 20020042569 A | 6/2002 |
| KR | 20020090354 A | 12/2002 |
| KR | 20030004243 A | 1/2003 |
| KR | 20060064557 A | 6/2006 |
| KR | 100766364 B1 | 10/2007 |
| NZ | 183790 A | 9/1980 |
| RU | 2168412 C2 | 6/2001 |
| RU | 2212125 C2 | 9/2003 |
| RU | 2351469 C2 | 4/2009 |
| SE | 8002613 L | 3/1982 |
| SE | 451067 B | 8/1987 |
| SU | 1031728 A2 | 7/1983 |
| TW | I257330 B | 7/2006 |
| WO | WO-7900473 A1 | 7/1979 |
| WO | WO-8500587 A1 | 2/1985 |
| WO | WO-9105644 A1 | 5/1991 |
| WO | WO-9215753 A1 | 9/1992 |
| WO | WO-9319347 A1 | 9/1993 |
| WO | WO-9427797 A1 | 12/1994 |
| WO | WO-2001064348 A1 | 9/2001 |
| WO | WO-0190020 A2 | 11/2001 |
| WO | WO-2004033793 A2 | 4/2004 |
| WO | WO-2004074733 A1 | 9/2004 |
| WO | WO-2005025768 A1 | 3/2005 |
| WO | WO-2006040503 A1 | 4/2006 |
| WO | WO-2006100550 A1 | 9/2006 |
| WO | WO-2006100693 A1 | 9/2006 |
| WO | WO-2008149389 A1 | 12/2008 |
| WO | WO-2008149390 A1 | 12/2008 |
| WO | WO-2009078430 A1 | 6/2009 |
| WO | WO-2009089906 A1 | 7/2009 |
| WO | WO-2009132692 A1 | 11/2009 |

(56) References Cited

FOREIGN PATENT DOCUMENTS

| | | |
|---|---|---|
| WO | WO-2010074811 A1 | 7/2010 |
| WO | WO-2012079173 A1 | 6/2012 |
| WO | WO-2012081486 A1 | 6/2012 |
| WO | WO-2013011092 A1 | 1/2013 |
| WO | WO-2014021884 A1 | 2/2014 |
| WO | WO-2014026794 A1 | 2/2014 |
| WO | WO-2014063242 A1 | 5/2014 |
| WO | WO-2014121198 A1 | 8/2014 |
| WO | WO-2014205577 A1 | 12/2014 |
| WO | WO-2015123769 A1 | 8/2015 |
| WO | WO-2015/154174 | 10/2015 |
| WO | WO-2015154162 A1 | 10/2015 |
| WO | WO-2016041054 A1 | 3/2016 |
| WO | WO-2016082030 | 6/2016 |
| WO | WO-2016082030 A1 | 6/2016 |
| WO | WO-2017000075 A1 | 1/2017 |
| WO | WO-2017041176 | 3/2017 |
| WO | WO-2017177324 A1 | 10/2017 |
| WO | WO-2018232507 A1 | 12/2018 |

OTHER PUBLICATIONS

Google Patents Translation of EP1785245. pp. 1-2. Retrieved Jul. 17, 2019. (Year: 2007).*
Abanades, et al. Conversion limits in the reaction of CO2 with lime. Energy and Fuels. 2003; 17(2):308-315.
Author Unknown, "Splicing Solution," Quarry Management, Oct. 2002, 3 pages.
Bhatia, et al. Effect of the Product Layer on the kinetics of the CO2-lime reaction. AIChE Journal. 1983; 29(1):79-86.
Chang, et al. The experimental investigation of concrete carbonation depth. Cement and Concrete Research. 2006; 36(9):1760-1767.
Chen, et al. On the kinetics of Portland cement hydration in the presence of selected chemical admixtures. Advances in Cement Research. 1993; 5(17):9-13.
"Clear Edge Filtration—Screen and Filter, Process Belts, and Screen Print," Mining-Techology.com, no date, [retrieved on May 25, 2010]. Retrieved from: http/www.mining-technology.com/contractors/filtering/clear-edge/, 2 pages.
U.S. Appl. No. 62/096,018, filed Dec. 23, 2014.
U.S. Appl. No. 61/839,312, filed Jun. 25, 2013.
U.S. Appl. No. 61/847,254, filed Jul. 17, 2013.
U.S. Appl. No. 61/879,049, filed Sep. 17, 2013.
U.S. Appl. No. 61/925,100, filed Jan. 8, 2014.
U.S. Appl. No. 61/938,063, filed Feb. 10, 2014.
U.S. Appl. No. 61/941,222, filed Feb. 18, 2014.
U.S. Appl. No. 61/992,089, filed May 12, 2014.
Dewaele, et al. Permeability and porosity changes associated with cement grout carbonation. Cement and Concrete Research. 1991; 21(4):441-454.
Dorbian "Nova Scotia-based CArbonCure garners $3.5 min in Series B funds," Reuters PE HUB, Dec. 11, 2013, 6 pages, found at http://www.pehub.com/2013/12/nova-scotia-based-carboncure-garners-3-5-min-in-series-b-funds/.
Estes-Haselbach. The greenest concrete mixer—carbon sequestration in freshly mixed concrete. Sep. 25, 2012.
European search report with written opinion dated Feb. 2, 2017 for EP2951122.
European search report with written opinion dated Jan. 20, 2017 for EP14818442.
European search report and search opinion dated Jan. 14, 2015 for EP 11849437.6.
Fernandez-Bertos, et al. A review of accelerated carbonation technology in the treatment of cement-based materials and sequestration of CO2. Journal of Hazardous Materials B112. 2004; 193-205.
Fluid Hole and Size. Newton: Ask a Scientist. Jan. 24, 2005. Retrieved from http://www.newton.dep.anl.gov/askasci/eng99/eng99365.htm on Jul. 13, 2013.
Freedman, S. Carbonation Treatment of Concrete Masonry Units. Modern Concrete. 1969; 33(5):33-6.
Gager, "Trumbull Corp.: CHARLEROI Lock & Dam," Construction Today, 2010, [retrieved on May 25, 2010]. Retrieved from http://www.construction-today.com/cms1/content/view/1909/104/, 2 pages.
"Glenium® 3400 NV: High-Range Water-Reducing Admixture," BASF, Product Data, Jun. 2010, 2 pages.
Goodbrake, et al. Reaction of Hydraulic Calcium Silicates with Carbon Dioxide and Water. Journal of the American Ceramic Society. 1979; 62(9-10):488-491.
Goto, et al. Calcium Silicate Carbonation Products. Journal of the American Ceramic Society. 1995; 78(11):2867-2872.
Goto. Some mineralo-chemical problems concerning calcite and aragonite, with special reference to the genesis of aragonite. Contribution from the department of geology and mineralogy. Faculty of Science. Hokkaido University. 1961. http://eprints.lib.hokudai.ac.jp/dspace/bitstream/2115/35923/1/10(4)_571-640.pdf.
Hesson, et al. Flow of two-phase carbon dioxide through orifices. AIChE Journal 4.2 (1958): 207-210.
Huijgen, et al. Mineral CO2 sequestration by steel slag carbonation. Environmental Science and Technology. 2005; 39(24):9676-9682.
Huntzinger, et al. Carbon dioxide sequestration in cement kiln dust through mineral carbonation. Environ Sci Technol. Mar. 15, 2009;43(6):1986-92.
Hurst. Canadian cement plant becomes first to capture CO2 in algae. Earth and Industry. Pond Biofuels press release. Mar. 19, 2010.
Iizuka, et al. Development of a new CO2 sequestration process utilizing the carbonation of waste cement. Industrial & Engineering Chemistry Research. 2004; (43)24:7880-7887.
International search report and written opinion dated Jan. 25, 2016 for PCT Application No. PCTCA2015/051220.
International search report and written opinion dated Mar. 6, 2012 for PCT Application No. CA2011/050774.
International search report and written opinion dated May 4, 2015 for PCT/CA2015/050118.
International search report and written opinion dated Jul. 16, 2015 for PCT Application No. PCT/CA2015/000158.
International search report and written opinion dated Jul. 16, 2015 for PCT Application No. PCT/CA2015/050318.
International search report and written opinion dated Jul. 18, 2013 for PCT Application No. CA2013/050190.
International Search Report and Written Opinion dated Aug. 30, 2016 for International application No. PCT/CA2016/050773.
International search report and written opinion dated Sep. 18, 2014 for PCT/CA2014/050611.
International Search Report and Written Opinion dated Oct. 19, 2016 for International Application No. PCT/CA2016/051062.
International search report dated May 16, 2014 for PCT Application No. PCT/US14/14447.
"International search report with written opinion dated Jul. 3, 2016 for PCT/CA2015/050195".
Kashef-Haghighi, et al. Accelerated Concrete Carbonation, a CO2 Sequestration Technology. 8th World Congress of Chemical Engineering WCCE8. Aug. 24, 2009.
Kashef-Haghighi, et al. CO2 sequestration in concrete through accelerated carbonation curing in a flow-through reactor. Ind. Eng. Chem. Res. 2010; 49:1143-1149.
Kawashima, et al. Dispersion of CaCO3 Nanoparticles by Sonication and Surfactant Treatment for Application in Fly Ash-Cement Systems. Materials and Structures. May 28, 2013. DOI 10.1617/S11527-013-0110-9.
Kim, et al. Properties of cement-based mortars substituted by carbonated fly ash and carbonated under supercritical conditions. IJAER. 9(24), 25525-25534 (2014).
Lange, et al. Preliminary investigation into the effects of carbonation on cement-solidified hazardous wastes. Environmental Science and Technology. 1996; 30(1):25-30.
Logan, C. Carbon dioxide absorption and durability of carbonation cured cement and concrete compacts. Thesis. Department of Civil Engineering, McGill University. Montreal, QC, Canada. 2006.

(56) References Cited

OTHER PUBLICATIONS

Lomboy, et al. Atom Probe Tomography for Nanomodified Portland Cement. Nanotechnology in Construction. Springer International Publishing, 2015. 79-86.
"MB-AETM 90: Air-Entraining Admixture" BASF, Product Data, Apr. 11, 2 pages, found at http://www.basf-admixtures.com/en/products/airentraining/mbae_90/Pages/default.aspx.
Mehta. "Concrete Carbonation". Materials World Magazine. Oct. 1, 2008 [Retrieved on Jul. 13, 2013] Retrieved from http://www.iom3.org/news/concrete-carbonation.
Monkman, et al. Assessing the Carbonation Behavior of Cementitious Materials. J. Mater. Civ. Eng. 2006; 18(6), 768-776.
Monkman, et al. Carbonated Ladle Slag Fines for Carbon Uptake and Sand Substitute. Journal of Materials in Civil Engineering. Nov. 2009;657-665.
Monkman, et al. Carbonation Curing of Slag-Cement Concrete for Binding CO2 and Improving Performance. Journal of Materials in Civil Engineering. Apr. 2010; 296-304.
Monkman, et al. Integration of carbon sequestration into curing process of precast concrete. Can. J. Civ. Eng. 2010; 37:302-310.
Monkman, G. S. Investigating Carbon Dioxide Sequestration in Fresh Ready Mixed Concrete. International Symposium on Environmentally Friendly Concrete—ECO-Crete Aug. 13-15, 2014, Reykjavik, Iceland.
Monkman, S. Maximizing carbon uptake and performance gain in slag-containing concretes through early carbonation. Thesis. Department of Civil Engineering and Applied Mechanics, McGill University. Montreal, QC, Canada. 2008.
Niven, et al. Carbon Dioxide Uptake Rate and Extent during Accelerated Curing of Concrete. International Congress on the Chemistry of Cement 2007. ICCC 2007.
Niven. Industrial pilot study examining the application of precast concrete carbonation curing. Cardon Sense Solutions Inc. Halifax, Canada. ACEME 2008.
Niven. Physiochemical investigation of CO2 accelerated concrete curing as a greenhosue gas mitigation technology. Theses from the Department of Civil Engineering and Applied Mechanics. McGill University, Montreal, Canada. Oct. 2006.
Notice of allowance dated Feb. 26, 2016 for U.S. Appl. No. 14/642,536.
Notice of allowance dated Mar. 29, 2016 for U.S. Appl. No. 14/701,456.
Notice of allowance dated Apr. 14, 2017 for U.S. Appl. No. 15/157,205.
Notice of allowance dated Apr. 22, 2014 for U.S. Appl. No. 13/660,447.
Notice of allowance dated Apr. 24, 2015 for U.S. Appl. No. 14/249,308.
Notice of allowance dated Apr. 24, 2017 for U.S. Appl. No. 15/161,927.
Notice of allowance dated Apr. 25, 2016 for U.S. Appl. No. 14/642,536.
Notice of allowance dated May 6, 2016 for U.S. Appl. No. 14/796,751.
Notice of allowance dated May 11, 2016 for U.S. Appl. No. 14/701,456.
Notice of allowance dated Jun. 24, 2015 for U.S. Appl. No. 14/249,308.
Notice of allowance dated Jul. 5, 2016 for U.S. Appl. No. 14/282,965.
Notice of allowance dated Aug. 5, 2016 for U.S. Appl. No. 14/796,751.
Notice of allowance dated Aug. 16, 2016 for U.S. Appl. No. 14/796,751.
Notice of allowance dated Sep. 14, 2016 for U.S. Appl. No. 14/796,751.
Notice of Allowance dated Dec. 21, 2016 for U.S. Appl. No. 15/161,927.
Notices of allowance dated Mar. 3, 2016 and Mar. 17, 2016 for U.S. Appl. No. 14/701,456.
Office action dated Jan. 25, 2016 for U.S. Appl. No. 14/701,456.
Office action dated Mar. 7, 2016 for U.S. Appl. No. 14/796,751.
Office action dated Mar. 7, 2017 for U.S. Appl. No. 15/434,429.
Office action dated Mar. 10, 2015 for U.S. Appl. No. 14/249,308.
Office action dated Mar. 14, 2017 for U.S. Appl. No. 15/228,964.
Office action dated Mar. 28, 2013 for U.S. Appl. No. 13/660,447.
Office action dated Apr. 26, 2016 for U.S. Appl. No. 14/950,288.
Office action dated May 10, 2017 for U.S. Appl. No. 13/994,681.
Office Action dated Jun. 16, 2016 for U.S. Appl. No. 13/994,681.
Office action dated Jul. 15, 2013 for U.S. Appl. No. 13/660,447.
Office action dated Jul. 30, 2015 for U.S. Appl. No. 14/282,965.
Office action dated Aug. 12, 2016 for U.S. Appl. No. 14/950,288.
Office action dated Aug. 14, 2015 for U.S. Appl. No. 14/701,456.
Office action dated Aug. 18, 2015 for U.S. Appl. No. 14/642,536.
Office action dated Aug. 22, 2016 for U.S. Appl. No. 15/161,927.
Office action dated Sep. 2, 2016 for U.S. Appl. No. 15/228,964.
Office action dated Sep. 28, 2016 for U.S. Appl. No. 15/157,205.
Office action dated Oct. 5, 2015 for U.S. Appl. No. 14/701,456.
Office Action dated Nov. 3, 2016 for U.S. Appl. No. 15/161,927.
Office action dated Dec. 2, 2015 for U.S. Appl. No. 14/282,965.
Office action dated Dec. 7, 2015 for U.S. Appl. No. 14/796,751.
Office Action dated Dec. 29, 2016 for U.S. Appl. No. 15/157,205.
Office Action dated Dec. 30, 2016 for U.S. Appl. No. 13/994,681.
Papadakis, et al. A reaction engineering approach to the problem of concrete carbonation. AIChE Journal. 1989; 35(10):1639-1650.
Papadakis, et al. Fundamental Modeling and Experimental Investigation of Concrete Carbonation. ACI Materials Journal. 1991; 88(4):363-373.
Phipps and Macdonald. Sustainability Leads to Durability in the New I-35W Bridge. Concrete International. Feb. 2009; vol. 31 Issue 2, p. 27-32.
"Pozzolith® 200N: Water-Reducing Admixture," BASF, Product Data, Sep. 2010, 2 pages, found at http://www.basf-admixtures.com/en/products/waterreducingretarding/pozzolith200n/Pages/default.aspx.
"Pozzolith® 322 N: Water-Reducing Admixture," BASF, Product Data, Mar. 2007, 2 pages.
Preliminary Amendment dated Nov. 1, 2013 for U.S. Appl. No. 13/994,681.
Reardon, et al. High pressure carbonation of cementitious grout. Cement and Concrete Research. 1989; 19(3):385-399.
Sato, et al. Effect of Nano-CaCO3 on Hydration of Cement Containing Supplementary Cementitious Materials. Institute for Research in Construction, National Research Council Canada. Oct. 2010.
Sato, et al. Seeding effect of nano-CaCO3 on the hidration of tricalcium silicate, Transportation Research Record. 2010; 2141:61-67.
Shao, et al. A new CO2 sequestration process via concrete products production. Department of civil engineering. McGill University, Montreal, Canada. 2007.
Shao, et al. CO2 sequestration using calcium-silicate concrete. Canadian Journal of Civil Engineering. 2006;(33)6:776-784.
Shao, et al. Market analysis of CO2 sequestration in concrete building products. Second International Conference on Sustainable Construction Materials and Technologies. Jun. 28-30, 2010.
Shao, et al. Recycling carbon dioxide into concrete: a feasibility study. Concrete Sustainability Conference. 2010.
Shi, et al. Studies on some factors affecting CO2 curing of lightweight concrete products. Resources, Conservation and Recycling. 2008; (52)8-9:1087-1092.
Shideler, J. Investigation of the moisture-volume stability of concrete masonry units. Portland Cement Association. 1955. (D3).
Shih, et al. Kinetics of the reaction of Ca(OH)2 with CO2 at low temperature. Industrial and Engineering Chemistry Research. 1999; 38(4):1316-1322.
Sorochkin, et al. Study of the possibility of using carbon dioxide for accelerating the hardening of products made from Portland Cement. J. Appl. Chem. USSR. 1975; 48:1271-1274.
Steinour, H. Some effects of carbon dioxide on mortars and concrete-discussion. Journal of the American Concrete Institute. 1959; 30:905-907.
Technology Roadmap: Cement. International Energy Agency. Dec. 2009 [Retrieved on Jul. 13, 2013]. Retrieved from http://www.iea.org/publications/freepublications/publication/name,3861,en.html.
Teir, et al. Carbonation of Finnish magnesium silicates for CO2 sequestration . Fifth Annual Conference on Carbon Capture and

(56) References Cited

OTHER PUBLICATIONS

Sequestration. May 8-11, 2006. National Energy Technology Laboratory, Department of Energy, USA.
The Vince Hagan Co., "Stationary, Radial Stacking, and Wet Belt Converyors—Product Brochure," 4 pages.
Toennies, et al. Artificial carbonation of concrete masonry units. American Concrete Institute Journal. 1960; 31(8):737-755.
Tri-Cast literature, Dry cast machine. Besser Company. Sioux, Iowa, USA. 06-09.
Van Balen, K. Carbonation reaction of lime, kinetics at ambient temperature. Cement and Concrete Research. 2005; 35(4):647-657.
Venhuis, et al. Vacuum method for carbonation of cementitious wasteforms. Environ Sci Technol. Oct. 15, 2001;35(20):4120-5.
Weber, et al. Find carbon dioxide gas under pressure an efficient curing agent for cast stone. Concrete. Jul. 1941; 33-34.
Young, et al. Accelerated Curing of Compacted Calcium Silicate Mortars on Exposure to CO2. Journal of the American Ceramic Society.. 1974; 57(9):394-397.
Co-pending U.S. Appl. No. 15/649,339, filed Jul. 13, 2017.
Co-pending U.S. Appl. No. 15/650,524, filed Jul. 14, 2017.
Co-pending U.S. Appl. No. 15/703,522, filed Sep. 13, 2017.
European search report dated Nov. 7, 2017 for EP Application No. 15776706.
European search report with written opinion dated Nov. 14, 2017 for EP Application No. 15777459.
European search report with written opinion dated Nov. 29, 2017 for EP15780122.
International search report with written opinion dated Jun. 15, 2017 for PCT/CA2017/050445.
Le et al. Hardened properties of high-performance printing concrete. Cement and Concrete Research, vol. 42, No. 3, Mar. 31, 2012, pp. 558-566.
Notice of allowance dated Jun. 15, 2017 for U.S. Appl. No. 15/157,205.
Notice of allowance dated Jun. 22, 2017 for U.S. Appl. No. 15/161,927.
Notice of allowance dated Jun. 30, 2017 for U.S. Appl. No. 15/434,429.
Notice of allowance dated Jul. 28, 2017 for U.S. Appl. No. 15/434,429.
Notice of allowance dated Aug. 2, 2017 for U.S. Appl. No. 15/161,927.
Office action dated Feb. 27, 2017 for U.S. Appl. No. 14/171,350.
Office action dated Jul. 3, 2017 for U.S. Appl. No. 14/171,350.
Office action dated Oct. 19, 2017 for U.S. Appl. No. 15/228,964.
Yelton, R. Treating Process Water. The Concrete Producer. pp. 441-443. Jun. 1, 1997.
Younsi, et al. Performance-based design and carbonation of concrete with high fly ash content. Cement and Concrete Composites, Elsevier Applied Science, Barking, GB, vol. 33, No. 1, Jul. 14, 2011. pp. 993-1000.
Co-pending U.S. Appl. No. 16/155,013, filed Oct. 9, 2018.
PCT/CA2018/050750 International Search Report and Written Opinion dated Sep. 6, 2018.
EP15862209.2 Extended European Search Report dated Oct. 8, 2018.
U.S. Appl. No. 15/170,018 Office Action dated Oct. 16, 2018.
U.S. Appl. No. 15/184,219 Office Action dated Oct. 16, 2018.
U.S. Appl. No. 15/240,954 Office Action dated Oct. 23, 2018.
Co-pending U.S. Appl. No. 15/911,573, filed Mar. 5, 2018.
Co-pending U.S. Appl. No. 15/304,208, filed Oct. 14, 2016.
Co-pending U.S. Appl. No. 62/083,784, filed Nov. 24, 2014.
Co-pending U.S. Appl. No. 62/086,024, filed Dec. 1, 2014.
Co-pending U.S. Appl. No. 62/146,103, filed Apr. 10, 2015.
Co-pending U.S. Appl. No. 62/160,350, filed May 12, 2015.
Co-pending U.S. Appl. No. 62/165,670, filed May 22, 2015.
Co-pending U.S. Appl. No. 62/215,481, filed Sep. 8, 2015.
Co-pending U.S. Appl. No. 62/240,843, filed Oct. 13, 2015.
Co-pending U.S. Appl. No. 62/321,013, filed Apr. 11, 2016.
Co-pending U.S. Appl. No. 62/522,510, filed Jun. 20, 2017.
Co-pending U.S. Appl. No. 62/554,830, filed Sep. 6, 2017.
Co-pending U.S. Appl. No. 62/558,173, filed Sep. 13, 2017.
Co-pending U.S. Appl. No. 62/559,771, filed Sep. 18, 2017.
Co-pending U.S. Appl. No. 62/560,311, filed Sep. 19, 2017.
Co-pending U.S. Appl. No. 62/570,452, filed Oct. 10, 2017.
Co-pending U.S. Appl. No. 62/573,109, filed Oct. 16, 2017.
Co-pending U.S. Appl. No. 62/652,385, filed Apr. 4, 2018.
Co-pending U.S. Appl. No. 62/675,615, filed May 23, 2018.
Co-pending U.S. Appl. No. 61/423,354, filed Sep. 15, 2010.
Co-pending U.S. Appl. No. 61/760,319, filed on Feb. 4, 2013.
Co-pending U.S. Appl. No. 61/976,360, filed Apr. 7, 2014.
Co-pending U.S. Appl. No. 61/980,505, filed Apr. 16, 2014.
EP15862209.2 Partial Supplementary European Search Report dated Jun. 20, 2018.
Mass. Premixed Cement Paste. Concrete International 11(11):82-85 (Nov. 1, 1989).
PCT Application No. PCT/CA2014/050611 as filed Jun. 25, 2014.
Cheung et al. Impact of admixtures on the hydration kinetics of Portland cement. Cement and Concrete Research 41:1289-1309 (2011).
Co-pending U.S. Appl. No. 16/249,012, filed Jan. 16, 2019.
Lobo et al. Recycled Water in Ready Mixed Concrete Operations. Concrete in Focus, Spring 2003 (2003). 10 pages.
Shao, et al. A new CO2 sequestration process via concrete products production. Department of civil engineering. McGill University, Montreal, Canada. 2006.
U.S. Appl. No. 15/304,208 Office Action dated Jan. 24, 2019.
U.S. Appl. No. 15/170,018 Notice of Allowance dated Dec. 19, 2018.
U.S. Appl. No. 15/184,219 Office Action dated Feb. 4, 2019.
U.S. Appl. No. 15/240,954 Ex Parte Quayle Office action dated Feb. 5, 2019.

* cited by examiner

SYSTEM AND METHOD OF APPLYING CARBON DIOXIDE DURING THE PRODUCTION OF CONCRETE

CROSS-REFERENCE TO RELATED APPLICATIONS

This application is a Continuation of U.S. patent application Ser. No. 14/171,350 filed on Feb. 3, 2014; which claims priority to U.S. Provisional Application No. 61/760,319, filed Feb. 4, 2013, each of which are incorporated herein by reference in their entirety.

FIELD OF THE INVENTION

Embodiments of the present invention generally relate to systems and methods used in the production of concrete. More particularly, the present disclosure relates to systems and methods for using carbon dioxide during the production of concrete.

BACKGROUND OF THE INVENTION

The production of cement and concrete are well known in the art. Concrete has many uses that are highly beneficial in many industries and can be produced to perform many functions. For example, concrete is widely used in commercial construction and for municipal projects. The concrete used in these projects may be pre-heated, pre-stressed, and reinforced.

Unfortunately, both the production of the cement used in concrete and the production of concrete are known to produce large amounts of carbon dioxide ($CO_2$). According to the US Energy Information Administration, cement manufacturers are a significant source of carbon dioxide pollution in the atmosphere. When cement is produced, the limestone feedstock is heated and $CO_2$ is released from the limestone. Cement manufacturers use a significant amount of energy in the cement manufacturing process to heat the limestone feedstock resulting in further $CO_2$ releases and hydrocarbon emissions. Systems and methods are known that have attempted to entrain $CO_2$ in the mixed concrete to reduce the $CO_2$ emissions into the atmosphere. Other systems and methods have attempted to use $CO_2$ to strengthen the concrete. However, all of these known systems and methods have drawbacks or problems associated therewith which are addressed in the present disclosure.

SUMMARY OF THE INVENTION

Embodiments of the present invention contemplate novel processes and apparatus directed to the use of carbon dioxide ($CO_2$) in the production of concrete and/or materials used for producing concrete. Applying $CO_2$ to concrete and/or to concrete materials prior to or during production of the concrete according to the systems and methods of embodiments of the present invention has many benefits compared to prior art methods of producing concrete.

Among the many benefits of embodiments of the present invention are a reduction in the amount of cement needed during concrete production and decreased energy consumption for the production of concrete. The addition of $CO_2$ to concrete in accordance with embodiments of the present invention results in a reduction in the cement component weight per unit of concrete, typically measured in pounds cement per cubic yard of concrete or kilograms cement per cubic meter of concrete. By weight and by volume, cement is typically the most expensive part of the large components of the concrete mix. By treating the concrete with $CO_2$, the total cost of a cubic meter or cubic yard of concrete is reduced. In addition to reducing the amount of cement required to produce concrete and the corresponding reduction in the cost associated with cement in the concrete mix, the total cost of production of concrete is reduced by adding $CO_2$ to the concrete, allowing a cubic yard of concrete or cubic meter of concrete to be produced at a lower total cost.

A further benefit of the addition of $CO_2$ to the concrete mix is an increase in the ratio of water to cement that may be used to produce the concrete. Freshly mixed concrete produced using the methods and systems of the present invention achieves a required slump, a measure of the workability of freshly mixed concrete, although the ratio of water to cement used to produce the concrete is greater than is possible for concrete produced using known methods. Thus, the present invention improves the consistency and workability of the freshly mixed concrete.

It is one aspect of the present invention to provide systems and methods of producing concrete with increased break strength and increased break strength consistency compared to concrete produced using known methods. The addition of $CO_2$ to concrete according to embodiments of the present invention measurably improves the break strength of the concrete, a key physical property of concrete, compared to control samples of concrete produced using known methods. Break strength tests of concrete samples produced and treated with $CO_2$ using the methods and apparatus of embodiments of the present invention show that the variability of break strength is reduced between 50% and 80% compared to concrete produced using other known methods. Further, treating concrete with $CO_2$ results in a more consistent concrete mix. Thus, the present invention allows concrete producers and users to formulate more precise concrete mix designs for the desired structural properties of the concrete treated with $CO_2$.

Another benefit of the present invention is a reduction in the temperature of the fresh mix concrete. When liquid carbon dioxide is injected from a tank or storage container into a mixer, the liquid carbon dioxide changes phase to both gaseous and solid carbon dioxide at atmospheric pressure. At atmospheric pressure, the solid $CO_2$ must be $-109°$ F. ($-78.5°$ C.) or less. Consequently, $CO_2$ applied to mixing concrete according to embodiments of the present invention cools the fresh concrete mix in proportion to the amount of $CO_2$ injected into the concrete mix. Reducing the temperature of fresh mix concrete is known to increase the strength of the cured concrete. Methods and apparatus to reduce the temperature of concrete are generally known in the art as disclosed in U.S. Pat. No. 8,584,864 and U.S. patent application Ser. No. 14/056,139 which are incorporated herein in their entirety by reference. Thus, by cooling the concrete mix, embodiments of the present invention increase the strength of the resulting cured concrete.

The systems and methods of embodiments of the present invention also produce concrete with reduced permeability and a reduced degradation rate, thereby increasing the service life of the concrete and structures made with the concrete. Those of skill in the art know that the carbonation level of concrete increases over time, reducing the permeability of the concrete. In other words, the small interstitial spaces within the concrete are filled in by the carbonation products from the carbonation reaction. The present invention speeds up the carbonation process resulting in an initial concrete product with less permeability compared to concrete produced using known methods. A less permeable concrete is less susceptible to environmental degradation which occurs when oxygen, water, and other liquids or contaminates permeate the concrete and cause oxidation (or "rust") of the steel reinforcing members within the concrete. Normal freeze/thaw cycles can also reduce the strength of the concrete permeated by oxygen, water, and other liquids by creating fissures within the concrete structure. Thus, structures made with concrete produced by embodiments of the systems and methods of the present invention have an increased service life.

Embodiments of the present invention also help decrease the CO2 footprint of cement and concrete production by trapping and/or sequestering CO2 in the concrete and reacting with CO2 during hydration of the cement during the concrete mixing process. The amount of energy consumed during the production of concrete using methods and systems of the present invention is also reduced because the amount of cement required to produce a given amount of concrete is reduced. By consuming CO2 in the production of concrete, the present invention reduces emissions of CO2, a known greenhouse gas believed to contribute to global warming, during the production of concrete. In addition, by reducing the amount of cement needed to produce concrete, embodiments of the present invention further reduce energy consumption and greenhouse gas emissions of cement manufacturers.

It is another aspect of embodiments of the present invention to provide a system and method for applying CO2 in a concrete production process. According to varying embodiments, this application may take the form of entraining, sequestering or consuming CO2 during the production of concrete or concrete material(s) used in the production of concrete. In varying embodiments described herein, the system and method may be performed "in-situ" where the materials for producing concrete are stored (such as in large containers or "pigs," or other storage devices at the production site) or may alternatively be performed through a separate sub-process. Embodiments of the present invention trap and/or sequester CO2 in the concrete resulting in reduced CO2 emissions during the production of concrete and decreasing greenhouse gas pollution. Applicant's invention includes special controls, injections, and devices to apply CO2 during the production of concrete, which are described and shown below.

In one embodiment, an apparatus for applying carbon dioxide to concrete or concrete materials is provided. The apparatus includes a storage container for storing liquid carbon dioxide. At least one load cell is affixed to the storage container for determining a weight of the storage container and the carbon dioxide stored therein. The at least one load cell is in communication with a system controller and the at least one load cell is operable to transmit information related to the weight to the system controller. Piping interconnects the storage container to an injection assembly. The piping is operable to transport the carbon dioxide to the injection assembly. The piping is operable at a temperature and at a pressure required to maintain the carbon dioxide in a liquid state. In one embodiment, the interconnection of the piping to the storage container is adapted to extract only liquid carbon dioxide from the storage container. A control valve is proximate to the storage container and is operable to prevent carbon dioxide from entering the piping when the control valve is in a closed configuration and the control valve enables carbon dioxide to enter the piping when the control valve is in an open configuration. The control valve is in communication with the system controller.

The apparatus includes a liquid-gas separator in fluid communication with the piping to separate gaseous carbon dioxide from liquid carbon dioxide before the injection assembly receives the carbon dioxide. The liquid-gas separator has a vent to release the gaseous carbon dioxide from the apparatus. In one embodiment, the gaseous carbon dioxide is released through the vent to the atmosphere. In another embodiment, the gaseous carbon dioxide separated from liquid carbon dioxide by the liquid-gas separator is returned to the storage container by second piping interconnecting the storage container to the vent of the liquid-gas separator.

The injection assembly receives carbon dioxide from the piping and injects carbon dioxide into a concrete mixer or a concrete material container. In one embodiment, the injection assembly is operable to cause a temperature of carbon dioxide to decrease to no more than about $-109°$ F. when carbon dioxide passes through the injection assembly. In another embodiment, the injection assembly injects between about 1 and about 27 pounds of carbon dioxide into the mixer or concrete material container for each cubic yard of concrete mix in the mixer or the material container. In still another embodiment, the injection assembly is operable to cause carbon dioxide to change state to a mixture of solid carbon dioxide and gaseous carbon dioxide and to inject the mixture of solid and gaseous carbon dioxide into the mixer.

The system controller is operable to control the control valve, the injection assembly, the liquid-gas separator, the mixer, and other sensors and controlled devices in communication with the system controller. In one embodiment, the system controller is operable to send a signal to move the control valve to the closed configuration when the system controller determines that the weight of the storage container and carbon dioxide stored therein has decreased by a predetermined amount. In another embodiment, the system controller is operable to send a signal to move the control valve to the closed configuration after a predetermined amount of time.

In one embodiment, the apparatus further comprises a mass flow controller in fluid communication with the piping and in communication with the system controller. The mass flow controller measures a mass of carbon dioxide that flows through the mass flow controller and transmits information related to the mass to the system controller. The system controller is operable to send a signal to move the control valve to the closed configuration when the system controller determines that a predetermined mass of carbon dioxide has flowed through the mass flow controller. In still another embodiment, the apparatus further includes a liquid carbon dioxide sensor operable to determine when gaseous carbon dioxide is in contact with the control valve of the piping. The liquid carbon dioxide sensor is in communication with the system controller and operable to transmit information related to the contact to the system controller. The system controller is operable to send a signal to move the control valve to the closed configuration when the liquid carbon dioxide sensor determines that gaseous carbon dioxide is in contact with the control valve. In yet another embodiment of the present invention, the apparatus is controlled by the system controller.

In one embodiment, the apparatus further comprises the material container. The material container includes a plurality of injectors with outlets facing an interior chamber of the material container. The plurality of injectors include inlets on an exterior surface of the material container. The inlets of the plurality of injectors are interconnected to the injection assembly. In still another embodiment, the material container includes a closure to seal the interior chamber and the interior chamber can be pressurized after it is sealed. The system controller is operable to control the inlets of the plurality of injectors and can send signals to open and close one or more pressure valves interconnected to the material container to increase or decrease the pressure within the interior chamber. The system controller is further operable to control each of the inlets of the plurality of injectors individually and to control the one or more pressure valves individually. Thus, the system controller can send a signal to decrease a flow of carbon dioxide to one inlet or to a plurality of inlets, and can send a second signal to a second inlet or to a plurality of inlets to increase a flow of carbon dioxide through the second inlet or plurality of inlets.

In another embodiment the apparatus includes the mixer. The mixer has a mixing chamber with an aperture. The mixing chamber receives carbon dioxide from the injection assembly and the predetermined amount of concrete materials. The mixing chamber is operable to mix carbon dioxide and the predetermined amount of concrete materials. In yet another embodiment, a closure is interconnected to the mixer to seal the aperture of the mixing chamber and the mixing chamber is pressurized after the closure seals the aperture. The mixing chamber is operable to mix carbon dioxide and the predetermined amount of concrete materials in the pressurized mixing chamber. In still another embodiment, the controller is operable to send signals to start and stop the mixer, to open and close the closure, to send signals to open and close one or more pressure release valves interconnected to the mixing chamber of the mixer.

It is another aspect of embodiments of the present invention to provide a method of applying carbon dioxide to concrete during the production of the concrete, the method generally comprising: (1) determining if there is sufficient carbon dioxide in a storage container; (2) after determining there is sufficient carbon dioxide in the storage container, starting a mixer; (3) placing a predetermined amount of concrete materials in a mixing chamber of the mixer, wherein the mixing chamber has an aperture; (4) determining if an injection assembly is in a position to inject carbon dioxide into the mixing chamber of the mixer, wherein the injection assembly is in fluid communication with the storage container by piping interconnected to the storage container, a control valve, a liquid-gas separator, and the injection assembly; (5) after determining the injection assembly is in the position to inject carbon dioxide into the mixing chamber, moving the control valve to an open configuration to allow liquid carbon dioxide to leave the storage container and enter the piping; (6) separating gaseous carbon dioxide from liquid carbon dioxide in the piping by the liquid-gas separator, wherein gaseous carbon dioxide is released from the piping through a vent to the atmosphere, and wherein liquid carbon dioxide continues through the piping to the injection assembly; (7) injecting carbon dioxide into the mixing chamber of the mixer by the injection assembly, wherein the injection assembly is operable to cause liquid carbon dioxide to change state to a mixture of solid carbon dioxide and gaseous carbon dioxide; (8) determining that a predetermined amount of carbon dioxide has been injected into the mixing chamber of the mixer; (9) after determining that the predetermined amount of carbon dioxide has been injected into the mixing chamber, moving the control valve to a closed configuration to prevent the liquid carbon dioxide from leaving the storage container, (10) mixing the concrete materials and carbon dioxide until a chemical reaction between the concrete materials and carbon dioxide is complete; and (11) discharging the concrete from the mixing chamber of the mixer. In one embodiment, the method is controlled by a system controller.

Optionally, the method may further comprise sealing the aperture of the mixing chamber with a closure after placing the concrete materials and carbon dioxide in the mixing chamber, and increasing the pressure in the mixing chamber after sealing the aperture of the mixing chamber. In one embodiment, the method includes adding at least one of a water reducer and an air entrainment agent to the concrete materials in the mixing chamber of the mixer. In one embodiment, the water reducer is BASF Pozzolith® 200 N. In another embodiment, the water reducer is BASF Pozzolith® 322. In yet another embodiment, the water reducer is BASF Glenium® 3400 NV. In one embodiment, the air entrainment agent is BASF's MB-AE™ 90. It shall be understood that other water reducers, air entrainment agents, and admixtures may be used with the method and apparatus of the current invention and are within the scope and spirit of the present invention as will be recognized by one of ordinary skill in the art.

In still another embodiment, determining that the predetermined amount of carbon dioxide has been injected into the mixing chamber of the mixer comprises as least one of measuring a weight of the storage container and/or measuring a mass of carbon dioxide that has flowed from the storage container.

In another aspect of the present invention, a method of applying carbon dioxide to concrete materials used in the production of the concrete is provided. The method generally comprises: (1) providing a supply of carbon dioxide in a storage container; (2) placing concrete materials in a chamber of a material container, wherein the material container has a plurality of injectors, wherein each of the plurality of injectors has a valve to control the flow of carbon dioxide through the injector, wherein each of the plurality of injectors has an inlet on an exterior surface of the chamber, and wherein each of the plurality of injectors has an outlet directed into the chamber; (3) interconnecting the storage container to the inlets of the plurality of injectors of the material container; (4) moving a control valve in fluid communication with the storage container and the plurality of injectors to an open configuration to allow the carbon dioxide to leave the storage container and pass through the plurality of injectors into the chamber of the material container, and (5) moving the control valve to a closed configuration after determining that a sufficient amount of carbon dioxide has been added to the concrete materials in the material container. In one embodiment, a water reducer and/or an air entrainment agent may be added to the concrete materials in the mixer. In another embodiment, the water reducer is BASF Pozzolith® 322. In yet another embodiment, the water reducer is BASF Glenium® 3400 NV. In one embodiment, the air entrainment agent is BASF's MB-AE™ 90. It shall be understood that other water reducers, air entrainment agents, and admixtures may be used with the method and apparatus of the current invention and are within the scope and spirit of the present invention as will be recognized by one of ordinary skill in the art.

Figure 1:
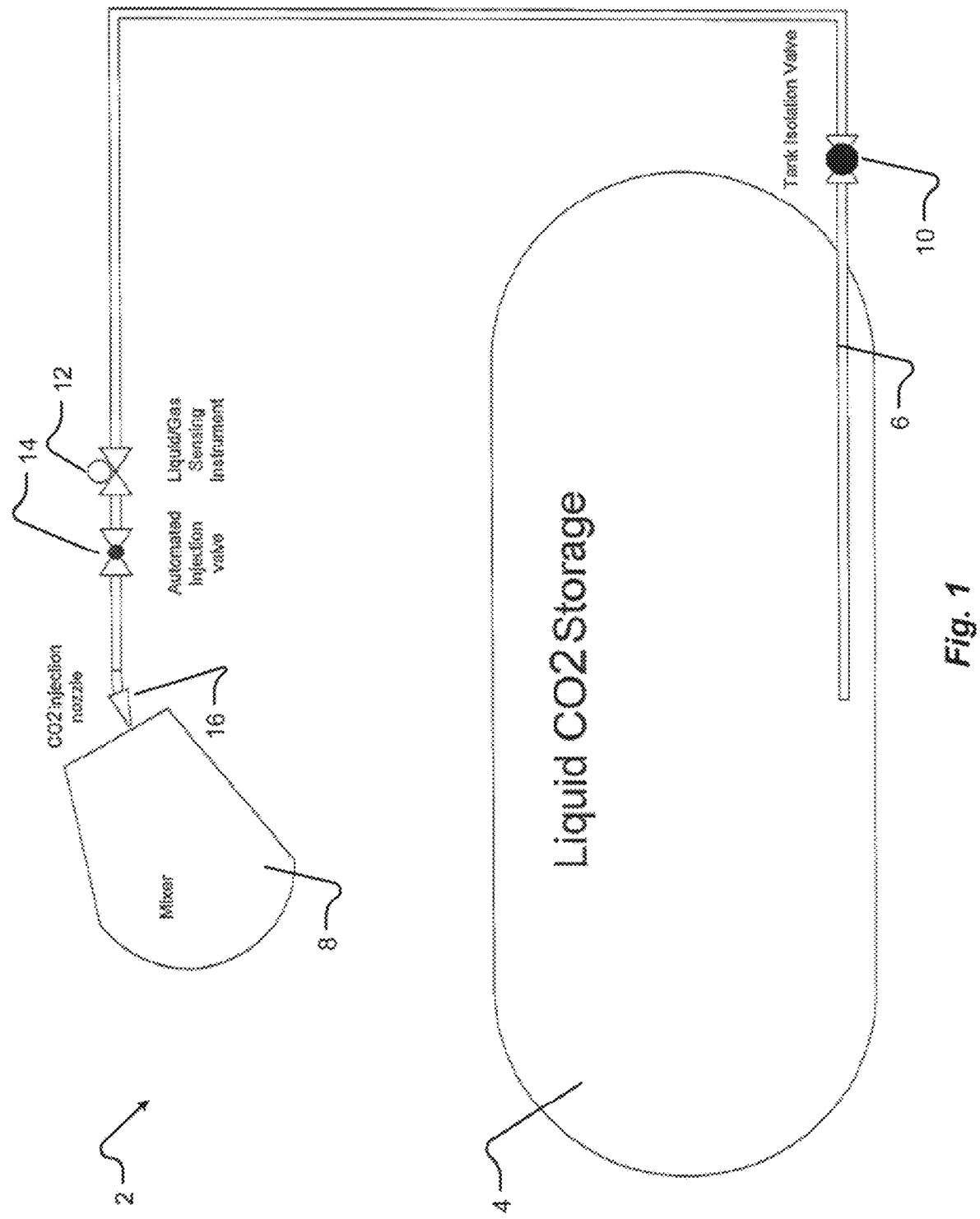
FIG. 1 is a flowchart diagram of a system for applying CO2 in a concrete production process according to a preferred embodiment of the present invention.

To assist in the understanding of embodiments of the present invention, the following list of components and associated numbering found in the drawings is provided below:

| Number | Component |
| --- | --- |
| 2 | System |
| 4 | Storage container |
| 6 | Piping |
| 8 | Mixer |
| 10 | Tank isolation valve |
| 12 | Liquid/gas sensing instrument |
| 14 | Automated injection valve |
| 16 | Injection assembly |
| 17 | Injector |
| 18 | System |
| 20 | Shut-off valve |
| 22 | Pressure reducing valves |
| 24 | Gas purifier |
| 26 | Pumping connection |
| 28 | Flange |
| 30 | Valve |
| 32 | Mass flow controller |
| 33 | Material container |
| 34 | System |
| 36 | Carbon dioxide |
| 38 | Load cells |
| 40 | Connection |
| 42 | System controller |
| 44 | Concrete materials |
| 46 | Position sensors |
| 48 | User interface |
| 50 | Electronic device |
| 52 | Wired network |
| 54 | Wireless network |
| 56 | Control valve |
| 58 | Liquid-gas separator |
| 59 | Liquid CO2 sensor |
| 60 | Gaseous carbon dioxide |
| 62 | Inlet |
| 64 | Outlet |
| 66 | Solid carbon dioxide |
| 68 | Concrete |
| 70 | Method |
| 77 | Start |
| 74 | Adjust set point of desired amount of CO2 |
| 76 | Determine amount of CO2 in storage container |
| 78 | Start mixer |
| 80 | Mixer filled |
| 82 | Determine position of injector assembly and mixer |
| 84 | CO2 delivery initiated |
| 86 | Control valve opened |
| 88 | CO2 leaves storage container |
| 90 | Liquid and gaseous CO2 separated |
| 92 | Liquid CO2 enters inlet of injection assembly |
| 94 | Liquid CO2 changes state |
| 96 | Solid and gaseous CO2 discharged from outlet into mixer |
| 98 | Determine amount of CO2 delivered |
| 100 | Control valve closed |
| 102 | Determine if concrete mixed and CO2 reaction complete |
| 104 | Concrete discharged |
| 106 | End of method |
| 110 | Computer |
| 112 | Sensor array |
| 114 | Controlled devices |

-continued

| Number | Component |
| --- | --- |
| 116 | Memory |
| 118 | Processor |
| 120 | Controller |
| 122 | Display |
| 124 | Input device |

DETAILED DESCRIPTION

Although the following text sets forth a detailed description containing different elements, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

According to certain embodiments of the present invention, systems and methods of applying CO2 to concrete, or alternatively to one or more of the concrete materials used in the production of concrete, are depicted in FIGS. 1-5. Referring now to FIG. 1, a system 2 for applying CO2 to concrete, or concrete materials, according to a preferred embodiment is illustrated. A vessel or storage container 4 is utilized to store liquid CO2. The storage container 4 may be of any material, shape, or size known to those of skill in the art and may be positioned generally vertically or horizontally. Piping 6 or other conduit interconnects the storage container 4 to a mixer 8 and is utilized to transport a predetermined amount of CO2 to the mixer 8. The piping 6 may be flexible or generally rigid. In one embodiment, at least a portion of the piping 6 is comprised of a flexible ultra-high vacuum (UHV) hose. Various types of mixers 8 known to those of skill in the art may be used with the embodiments of the present invention, including, for example, tilt drum mixers, single and twin shaft compulsory mixers, paddle mixers, pressurized reactor/mixers, truck mounted mixers, transit mix trucks continuous mixers, and mixers with mixing chambers that can be sealed with a closure.

The system 2 includes one or more of a tank isolation valve 10, a liquid/gas sensing instrument 12, and an automated injection valve 14 to regulate the flow of CO2 between the storage container 4 and the mixer 8. One or more injection assemblies 16, which may also be referred to as snow horns, apply the CO2 to the concrete and/or directly to one or more of the concrete materials used in the production of concrete. Snow horns suitable for use as injection assemblies 16 with the current invention are generally known. For example, U.S. Pat. No. 3,667,242 entitled "Apparatus for Intermittently Producing Carbon Dioxide Snow by Means of Liquid Carbon Dioxide," which is incorporated by reference herein in its entirety, generally discloses an improved snow horn for producing carbon dioxide snow in a controlled intermittent manner upon demand.

The CO2 is generally injected into the mixer 8 while the concrete materials are beginning to combine during mixing. The CO2 may be applied to the concrete or the concrete materials in a gaseous, liquid, or solid state. The injection assemblies 16 permit dispensing the CO2 directly into mixers 8 of all types.

The injection assemblies 16 may be situated to communicate CO2 to the concrete mixer 8 in use during production at a concrete production facility, central mix batch plant, or at a job site. Alternatively, the concrete mixer 8 may be replaced by a material container or other structure (including a stack or pile of concrete materials) housing the concrete or concrete materials used in producing concrete. For example, carbon dioxide may be delivered by the system 2 to concrete materials stored at a jobsite using existing structures and equipment. At the jobsite, cement and other concrete materials normally rest in a material container, such as, in the case of cement, a container known as a "pig." The interior surface of the material containers include a plurality of inwardly facing injector outlets. Tubing or piping interconnects the inlets of the plurality of injectors to a source of compressed air. In known equipment, compressed air is injected into the material container through one or more of the plurality of injectors into the concrete materials to "fluidize" the concrete materials such that they flow out of the material container. In addition, compressed air is also often injected into cement in delivery trucks to transfer the cement from the trucks into the storage facilities. In a preferred embodiment, the systems and methods of the current invention utilize existing structures and injectors for fluidizing the concrete materials and cement to apply CO2 to the concrete and/or concrete materials and to achieve the benefits of applying CO2 described herein. For example, in one preferred embodiment, system 2 is interconnected to injectors of a material container in place of the source of compressed air. When the concrete material in the material container is required for the production of a batch of concrete, the system 2 injects compressed gaseous CO2 from container 4 into the material container through the plurality of injectors, fluidizing the concrete material and treating the concrete material with CO2. Each of the plurality of injectors may be individually controlled such that the flow of CO2 may be precisely controlled and the CO2 can be selectively injected through some or all of the plurality of injectors. Further, the rate of the flow of CO2 through each of the plurality of injectors can be individually controlled such that some injectors may be partially opened allowing a low rate of flow of CO2, while other injectors may allow a greater rate of flow of CO2. In alternate embodiments of the present invention, the application of CO2 is performed by separate and/or additional equipment, as will be understood from a review of the detailed description and drawing figures provided herein.

In one embodiment, control of the amount of CO2 applied to the concrete and/or the concrete materials can be accomplished by connecting load cells (or scales) to the CO2 storage container 4 with constant monitoring of the weight of the container 4 and the CO2 within the container. A system controller (described below) can be set to open and close one or more valves when a pre-set weight of the CO2 has been dispensed from the container 4. Said differently, once the controller determines that the combined weight of the storage container 4 and the CO2 therein has decreased by a predetermined amount corresponding to the desired weight of CO2 to be injected into the concrete mix, the system controller will generate a signal to close one or more valves to stop the flow of CO2 from the storage container 4, ensuring the proper amount of CO2 has been injected into the concrete and/or concrete materials. The Applicant has found that injecting too much CO2 into the process is undesirable and can negatively impact the quality of the concrete. Thus, monitoring the differential weight of the container 4 to control the amount of CO2 dispensed ensures a predetermined amount of CO2 is applied to the concrete to achieve the desired design characteristics of the concrete. The applicant has found that the addition of between about 1 to 27 pounds of CO2 per cubic yard of concrete increases the break strength and physical properties of the concrete mixture. This is just one example and it should be understood that the amount of CO2 added to the concrete may vary based upon various design requirements of the concrete and the components and admixtures added to the concrete. For example, in one embodiment, more than about 27 pounds of CO2 is added per cubic yard of concrete.

Another method of controlling the amount of CO2 applied to the concrete and/or the concrete materials is by a timed application. In this embodiment, a timer relay switch is set to open a valve 10 and allow injection of CO2 into the mix for a set amount of time. The length of time the valve 10 remains open may be determined based on the pressure of the CO2 in the storage container 4 and/or flow rate of the CO2 monitored by the injection assembly 16. In yet another embodiment, CO2 can be manually added to the concrete and/or concrete materials by a user manually opening and closing one or more valves.

Additional elements and equipment may also be included with the system 2 for enhancing the system and method disclosed herein. For example, equipment described in relation to FIGS. 2-5 below may be used with the embodiment of the present invention described above in conjunction with FIG. 1.

Figure 2:
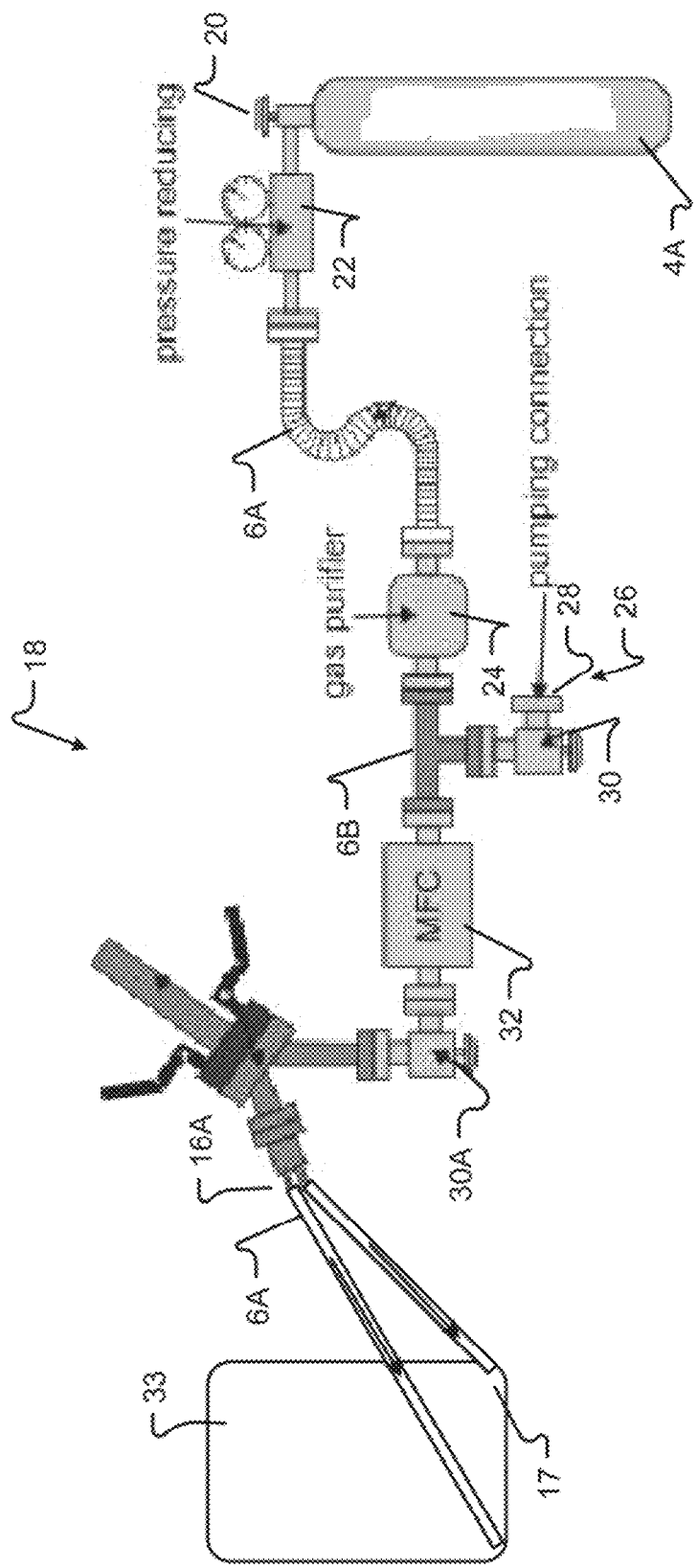
FIG. 2 is a system for applying CO2 to concrete materials according to another embodiment of the present invention.

Another embodiment of a system 18 for applying CO2 to concrete or concrete materials is illustrated in FIG. 2. Similar to the system 2 discussed above, the system 18 has a storage container 4A containing carbon dioxide in fluid communication with an injection assembly 16A by piping 6A, 6B. The piping includes both flexible 6A portions and generally rigid 6B portions. The system 18 may include one or more of a shut-off valve 20, pressure reducing valves 22, a gas purifier 24, a pumping connection 26 with a flange 28, and one or more valves 30. The amount of CO2 applied to the concrete mix or the concrete materials is controlled by use of a mass flow controller 32 coupled to a cryogenic control valve 30A. The mass flow controller 32 measures and continuously reports the mass of CO2 that has flowed through the mass flow controller 32 to a system controller (described below). When the system controller determines that a pre-set mass of CO2 has passed through the mass flow controller 32, the system controller sends a signal to close the control valve 30A, the shut-off valve 20, and/or one or more valves within the injection assembly 16A. Various mass flow controllers 32 and control valves 30A are commercially available and suitable for use with embodiments of the present invention. Two examples of valves that may be used with the present invention include ASCO® cryogenic valves and liquid CO2 solenoid valves. The Sierra® Instruments InnovaMass® 240 model cryogenic mass flow controller is one example of a cryogenic mass flow controller that is suitable for use in the present invention. Methods of metering the CO2 by weight, time, mass, or manual application may be combined and or used alternatively. In one embodiment, CO2 may be applied to the concrete mix by a combination of metering CO2 by weight using load cells, by mass in conjunction with a mass flow controller, by time, and/or by a manual application. Optionally, the valves 20, 30A and valves of the injection assembly 16A may be manually opened and closed by a user.

In the embodiment illustrated in FIG. 2, the injection assembly 16A has been interconnected by piping 6A to a plurality of injectors 17 of a material container 33, or "pig," with an interior chamber for storing concrete materials. The injectors 17 have outlets directed inward or facing the interior chamber of the material container. Inlets of the injectors 17 are positioned on an exterior surface of the material container. Each of the plurality of injectors 17 has a valve that may be actuated to individually control the flow of CO2 through the injector 17. The controller is operable to send a signal to each of the plurality of injectors 17 to open or close the valve of the injector 17 and to increase or decrease the flow of CO2 through each of the injectors 17. The chamber of the storage container has an aperture that is open. By opening one or more valves 20, 30, 30A, a supply of carbon dioxide is applied through the injectors 17 to the interior of the material container 33, treating the concrete materials in the material container 33 with CO2 in accordance one embodiment of the present invention. In yet another embodiment, liquid CO2 is applied to the concrete materials in the material container 33. Optionally, a closure may be interconnected to material container to seal the aperture to prevent the CO2 injected into the material container from escaping. In one embodiment, the chamber may be pressurized after the aperture is sealed by the closure.

Figure 3:
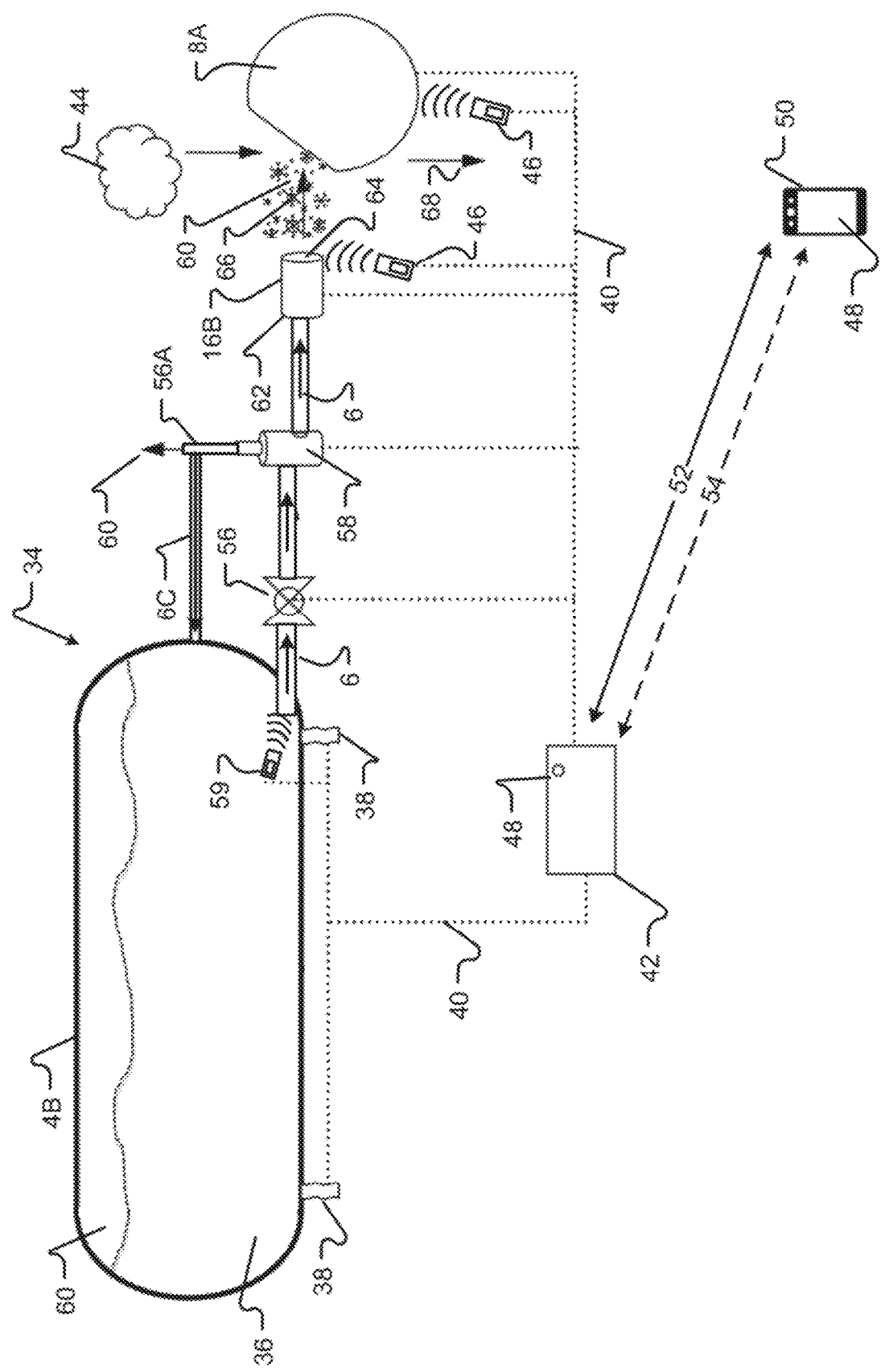
FIG. 3 is a system for applying CO2 in a concrete production process according to yet another embodiment of the present invention.
Figure 4:
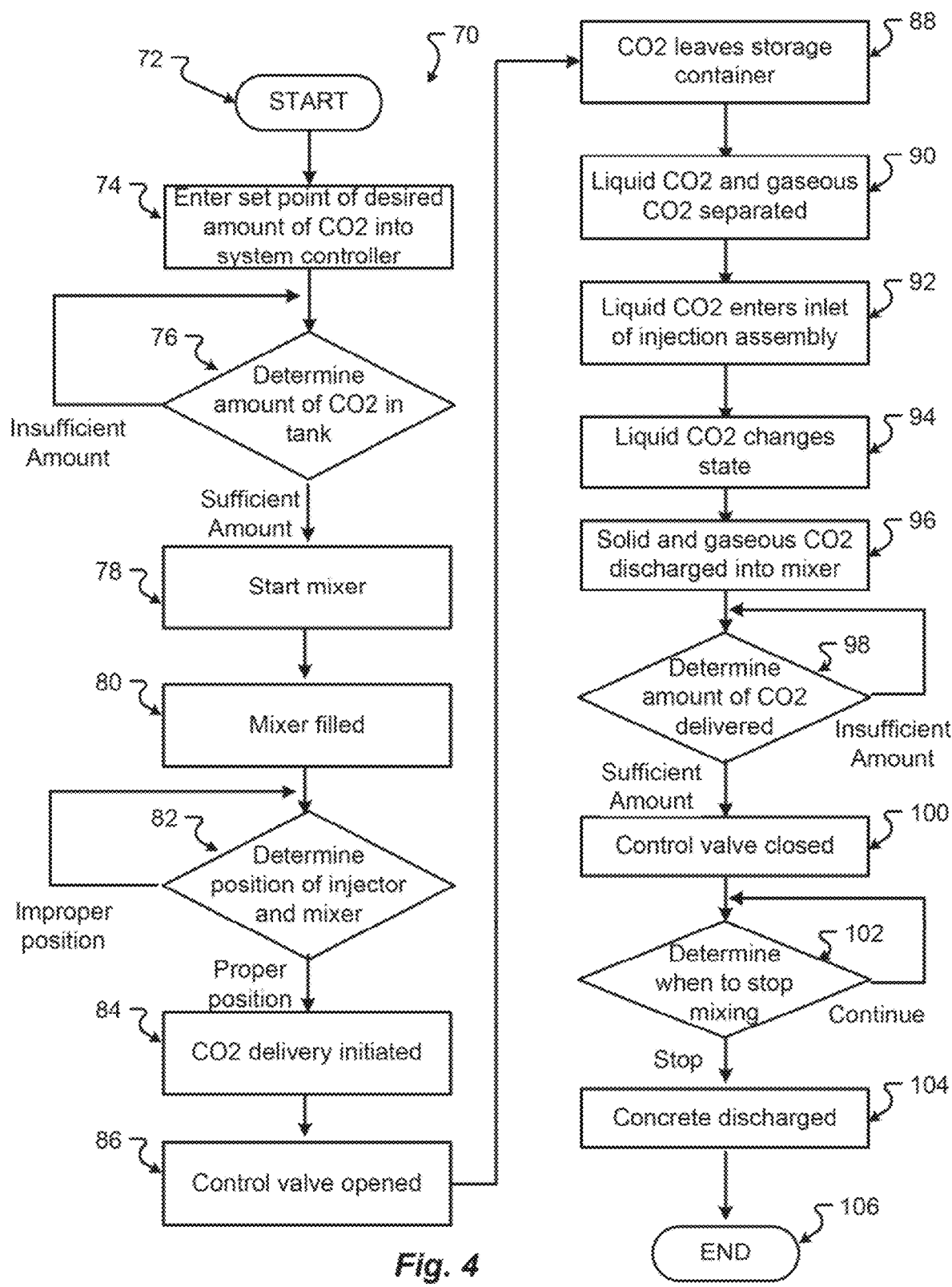
FIG. 4 is flowchart diagram of a preferred embodiment of a method for applying CO2 according to the present invention and which relates to the system depicted in FIG. 3.

Referring now to FIGS. 3 and 4, a system 34 and a method 70 according to one particular embodiment are illustrated. While a general order of the steps of the method 70 are shown in FIG. 4, the method 70 can include more or fewer steps or the order of the steps may be arranged differently than the method 70 illustrated in FIG. 4 and described herein.

The method 70 starts 72 when a desired amount of carbon dioxide 36 to be delivered to the mixer 8A is entered 74 into a system controller 42. The set point can be a weight or mass of CO2. The set point may be selected from a list of predetermined mixtures based on design specifications for the concrete being produced which may be displayed in a user interface 48 in communication with the system controller 42. Alternatively, a custom amount of carbon dioxide to be delivered to the mixer 8A may be entered into the controller 42 by a user through the user interface 48. The user interface 48 may be generated by a portable electronic device 50 physically separated from the system controller 42. Examples of electronic devices 50 include smartphones, tablet devices, laptop computers, other portable computers, or other devices running software or an application (or "an app") adapted to interact with the system controller 42 and capable of communicating with the system controller 42 over either a wired 52 or a wireless 54 network. The electronic device 50 may generate the user interface 48 to enable a user, such as a cement truck operator, to access the system controller 42 to control the system 34 and method 70. In one embodiment, the user may access, receive information from, and control the system controller 42 and the sensor array and controlled devices in signal communication therewith by using an electronic device 50 to communicate with the system controller 42 over an internet connection.

After the set point for the desired amount of CO2 to be added to the concrete mix is entered 74 into the system controller 42, the system controller 42 determines 76 if there is a sufficient amount of carbon dioxide in the storage container 4B. Load cells 38 are affixed to the storage container 4B and constantly monitor the combined weight of the storage container 4B and liquid carbon dioxide 36 and gaseous carbon dioxide 60 contained therein. The combined weight of the storage container 4B and carbon dioxide therein are continuously transmitted by the connection 40 to the system controller 42. By subtracting the known empty weight of the container 4B from the combined weight of the container 4B and the carbon dioxide therein, the controller can determine the weight of CO2 in the storage container 4B. If the system controller 42 determines 76 an insufficient amount of carbon dioxide 36 is available, the method 70 returns until a sufficient amount of carbon dioxide is available in the storage container 4B. If the system controller 42 determines 76 there is a sufficient amount of carbon dioxide available, the method 70 continues to 78 and the system controller 42 sends a signal by connection 40 to start the mixer 8A.

A mixing chamber of the mixer 8A is filled 80 with concrete materials 44 (such as, for example rock, sand, other aggregates, water, other cementitious materials, admixtures, and cement) per the desired mix design and mixing continues. In one embodiment, sensors in communication with the system controller 42 are operable to measure the weight or volume of the concrete materials 44 to be added to the concrete mix. The system controller 42 is further operable to control conveyors, belts, pipes, or valves required to transport the concrete materials 44 to be added to the concrete mix to the mixing chamber of the mixer 8A.

Those of skill in the art will recognize that various concrete materials 44 and admixtures may be added to the concrete mixer 8A as required by design considerations based on the use and desired characteristics of the concrete. Concrete materials 44 including, but not limited to, plastic, polymer concrete, dyes, pigments, chemical and/or mineral admixtures, or similar materials that may be represented in a variety of types and composition mixes having various combinations of ingredients may be added to the mixer 8A. When combined in the mixer 8A, the selected concrete materials 44 create a concrete with desired characteristics. The Applicant has found that the addition of water reducers and/or air entrainment agents to the concrete materials 44 in the mixer 8A is advantageous. Water reducers suitable for use in the present invention include, by way of example only, Pozzolith® 200 N water-reducing admixture, Pozzolith® 322 N water-reducing admixture, and Glenium® 3400 NV high-range water-reducing admixture, which are each produced by BASF. One example of a suitable air entrainment agent is BASF's MB-AE™ 90 air-entraining admixture. It shall be understood that other water reducers, air entrainment agents, and admixtures may be used with the method and apparatus of the current invention and are within the scope and spirit of the present invention as will be recognized by one of ordinary skill in the art.

The position of an injection assembly 16B or snow horn relative to the mixer 8A is monitored by sensors 46 and transmitted by connection 40 to the system controller 42. The sensors 46 may comprise optical, linear, or angular position sensors that, among other things, track the relative and/or absolute positions of the various movable components of the injection assembly 16B and the mixer 8A and the alignment of stationary and moveable components. The injection assembly 16B, mixer 8A, and sensors 46 may be moved, positioned, and pointed by the system controller 42. When the system controller 42 determines 82 that the injection assembly 16B is in an appropriate position relative to the mixer 8A, the process 70 continues and the user may initiate 84 the delivery of carbon dioxide by pressing a "start" button or other button on the user interface 48. The system controller 42 then sends a signal by connection 40 to open a control valve 56. The valve 56 opens 86 and liquid 36 carbon dioxide leaves 88 the storage container 4B by delivery piping 6.

The inventors have found that the efficiency of the system 34 is improved when substantially all of the CO2 transmitted to the injection assembly 16B is in a liquid 36 state. The piping 6 and other components of the system 34 are designed to operate at temperatures and pressures required to maintain the CO2 in a liquid 36 state once it leaves the storage container 4B. Additionally, positioning the CO2 storage container 4B as close as possible to the injection assembly 16B reduces the amount of liquid carbon dioxide 36 that changes phase to a gaseous 60 state.

To further increase the ratio of liquid 36 CO2 compared to gaseous 60 CO2, the system 34 includes a liquid-gas separator 58 to separate 90 the gaseous carbon dioxide 60 from the liquid carbon dioxide 36. The gaseous carbon dioxide 60 is returned to the storage container 4B by additional piping 6C interconnected to a return valve 56A of the liquid-gas separator and the storage container. Optionally, the gaseous carbon dioxide 60 may be vented into the atmosphere through a release valve or vent. In one embodiment, the liquid-gas separator 58 includes a valve 56A with a first position to vent the gaseous carbon dioxide 60 to the atmosphere. The valve 56A has a second position to return the gaseous carbon dioxide 60 to the storage container 4*b* through the additional piping 6C. The liquid-gas separator 58 and the valve 56A are in signal communication 40 with the system controller 42 and the system controller 42 is operable to control the valve 56A.

The percentage of liquid carbon dioxide 36 present in the piping 6 can also be increased by designing the storage container 4B to retain the gaseous carbon dioxide 60. In one embodiment, the piping 6 is interconnected to a lower surface of the storage container 4B to extract only liquid carbon dioxide 36 from the storage container 4*b* leaving the gaseous carbon dioxide 60 in the head space of the storage container. In a preferred embodiment, the piping 6 is interconnected to the bottom of the storage container 4B. In addition, the system 34 may include a liquid CO2 sensor 59 adapted to determine if liquid carbon dioxide 36 is in proximity to the control valve 56 and can send information collected by the sensor 59 to the system controller 42 by connection 40. The liquid CO2 sensor 59 is further operable to transmit a signal to the system controller 42 when gaseous carbon dioxide 60 is in contact with the piping 6 or the control valve 56. The liquid CO2 sensor 59 can be positioned proximate to the control valve 56. In one embodiment, a liquid CO2 sensor 59 is positioned inside the storage container 4B.

Optionally, the liquid-gas separator 58 may also include a mass flow controller. The combined separation instrument and mass flow controller continuously monitors the mass of the gaseous carbon dioxide 60 separated and the mass of the liquid carbon dioxide 36 that passes through the separation instrument 58 and transmits these masses to the system controller 42 by connection 40. The system controller 42 may optionally use the information transmitted from the mass flow controller to determine when the pre-set amount of CO2 has been delivered and then send a signal to close the control valve 56.

After passing through the separator 58, the liquid carbon dioxide 36 continues through the piping 6 and enters 92 an inlet 62 of the injection assembly 16B. The pressure differential from the inlet 62 of the injection assembly 16B to the outlet 64 of the injection assembly 16B causes the carbon dioxide to change state 94 from a liquid 36 to a gas 60 and from a liquid 36 to a solid 66 so that the CO2 ejected from the outlet 64 of the injection assembly 16B is a mixture of solid carbon dioxide 66 snow and gaseous carbon dioxide 60. The pressure differential also causes the temperature of the CO2 to decrease. In one embodiment, the pressure differential causes the temperature of the CO2 to decrease to no more than −109° F. In another embodiment, the temperature of the CO2 decreases to less than −109° F. The mixture of solid 66 and gaseous 60 carbon dioxide is discharged 96 into the mixer 8A.

According to a preferred embodiment of the present invention, the concrete 68 is mixed in a CO2 atmosphere created by flooding the mixing chamber of the mixer 8A with CO2. The mixing chamber may have an open aperture. In some embodiments of the present invention, a closure adapted to seal the aperture may be interconnected to the mixer 8A. The mixing chamber of the mixer 8A contains air which has been intentionally enriched with CO2. According to this embodiment, substantially all the air in the mixing chamber is replaced with gaseous CO2.

It is one aspect of embodiments of the present invention to mix the concrete 68 and CO2 in a mixer 8A with a mixing chamber that has an aperture that can be sealed with a closure. The mixing chamber is loaded with concrete materials 44 (such as rock, sand, aggregates, water, cement, and/or materials and admixtures) and CO2 according to a predetermined mix design as described above. Optionally, the CO2 may be added to the mixing chamber of the mixer 8A in a liquid state 36. The aperture of the mixing chamber is then sealed by the closure and the mixer 8A started. Optionally, in one embodiment, the CO2 may be injected into the mixing chamber after the mixing chamber is sealed by the closure. The sealed mixing chamber of the mixer 8A may also be pressurized. Pressure sensors within the mixing chamber transmit a pressure within the sealed mixing chamber to the system controller by connection 40. The system controller 42 can control the pressure within the sealed mixing chamber by adding a predetermined amount of CO2 to the mixing chamber. The controller 42 can also open one or more valves interconnected to the mixing chamber to reduce the pressure within the mixing chamber to keep the pressure at a predetermined amount or to vent the pressure prior to opening the closure sealing the aperture of the mixing chamber. Pressurized reactors that keep materials sealed in a mixing chamber during a mixing process are known to those of skill in the art. Mixing the concrete materials 44 and CO2 in a sealed mixing chamber results in almost all of the CO2 being sequestered in the concrete 68 during the mixing process, achieving a more complete reaction and greater saturation of CO2 in the concrete materials 44.

In another embodiment, solid carbon dioxide 66 may be added to the concrete materials 44 in a mixer 8 with either an open or sealed mixing chamber. In this embodiment, the solid carbon dioxide 66 will react with and sublimate into the concrete 68 during the mixing of the concrete materials 44. The system may also comprise a slinger/crusher for use with solid carbon dioxide 66 blocks or dry ice. Regular water ice in block form may be added to the concrete mix in place of mix water for the purposes of hydrating and cooling the mix simultaneously.

Equipment known in the industry which is used for grinding up water ice blocks and adding the ground ice into the concrete mix in the mixer 8 can be modified to accept solid carbon dioxide 66 blocks for addition to the concrete mix. Using solid carbon dioxide 66 both treats the concrete mix with CO2 and cools the concrete mix.

The system controller 42 continuously monitors the load cells 38 and optionally the mass information transmitted from the optional mass flow controller to determine 98 the amount by weight or mass of carbon dioxide 36 that has left the storage container 4B. When the system controller 42 determines 98 that the desired or set amount of carbon dioxide 36 has been delivered, the system controller 42 sends a signal by connection 40 to close the control valve 56. The control valve 56 closes 100 and the flow of carbon dioxide from the storage container 4B stops. Optionally, the system controller 42 can control the amount of CO2 delivered to the mixer 8A by sending a signal to close the control valve 56 a predetermined amount of time after the control valve 56 was opened. The system controller 42 is also operable to control the rate of CO2 delivered to the mixer 8A by sending a signal to the control valve 56 to increase or decrease the flow of CO2 through the control valve 56.

The gaseous 60 and solid 66 CO2 in the mixer 8A mixes 98 and chemically reacts with the concrete materials 44 to change the physical properties of the concrete. The mixer 8A continues to mix the fresh concrete and CO2 until the system controller 42 determines 102 the concrete is thoroughly mixed and that the chemical reaction of the CO2 is complete. The freshly mixed concrete 68 is discharged 104 from the mixer 8A and the method 70 ends 106. The system controller 42 can send a signal to the mixer 8A causing the mixer 8A to discharge the mixed concrete and to stop the mixer. The method 70 may repeat to produce subsequent batches of concrete 68. The system 34 can be scaled to deliver small or large batches of concrete treated with CO2. For example, in one embodiment the system 34 can produce approximately 1,000 cubic yards of concrete per day. However, this is just one example and those of skill in the art will understand that they system 34 can be designed to produce a larger or a smaller amount of concrete each day.

It is expressly understood in making the foregoing disclosure of this preferred embodiment that other steps may be included, or certain steps omitted in the process, and that the steps do not necessarily have to occur in this precise order to accomplish the benefits described herein.

In all embodiments of the present invention, liquid 36, gaseous 60, and/or solid 66 CO2 may also be injected or applied directly to concrete materials 44 prior to mixing the concrete materials 44 in the mixer 8. Sand, rock, and other fine or coarse aggregates may be treated by injecting CO2 into aggregate stockpiles, infusing the aggregates with CO2, storing the aggregates in an enriched CO2 atmosphere (for example a sealed chamber or storage tank containing gaseous, liquid, and/or solid CO2), or soaking the aggregates in a CO2-rich medium such as carbonated water. Cement may be treated with CO2 by altering the production process of cement to increase the amount of CO2 retained in the final product, by injecting CO2 into a cement storage vessel or "pig," or by storing cement in an enriched CO2 atmosphere. In one embodiment, the cement production process may be altered to reduce the amount of CO2 driven off in the process of making cement or by adding CO2 in the process to enrich the cement.

Other cementitious materials used for concrete production, such as fly ash, pozzolan, or ground granulated blast furnace slag (GGBFS), can also be treated with CO2 prior to being added to a mixer 8 in a manner similar to those discussed above. For example, CO2 may be injected into or added to the other cementitious materials while they are in storage by storing the cementitious material in an enriched CO2 atmosphere. Alternatively, the production process of the cementitious material may be altered to increase the amount of CO2 retained in the final product, for example, by adding CO2 in the process to enrich the cementitious material.

Water used in the production of the concrete may also be used as a transport mechanism to add CO2 to the concrete 68 and/or concrete materials 44. CO2 may be injected into the mix water to measurably increase the CO2 content of the water. Carbonated mix water may also be used in the production of concrete 68 according to embodiments of the present invention. The water may be naturally occurring carbonated water or may be processed carbonated water enriched with carbon dioxide directly or indirectly. Any method of treating or processing water which increases the level of CO2 for mix water may be used with embodiments of the present invention. In one embodiment, effluent water from a direct hydrocarbon fired heater is used to add CO2 to the concrete mix.

Concrete additives and/or admixtures may also be used to add CO2 to the concrete materials 44 and/or the concrete mix. For example, concrete additives or compounds which contain CO2, or act to release CO2 into the concrete mix or promote reaction of CO2 with the concrete mix may be added to the concrete and/or concrete materials 44. A predetermined amount of concrete additives or compounds can be added to the concrete mix to add a desired amount of CO2 to the concrete 68 based on design characteristics of the concrete 68.

Figure 5:
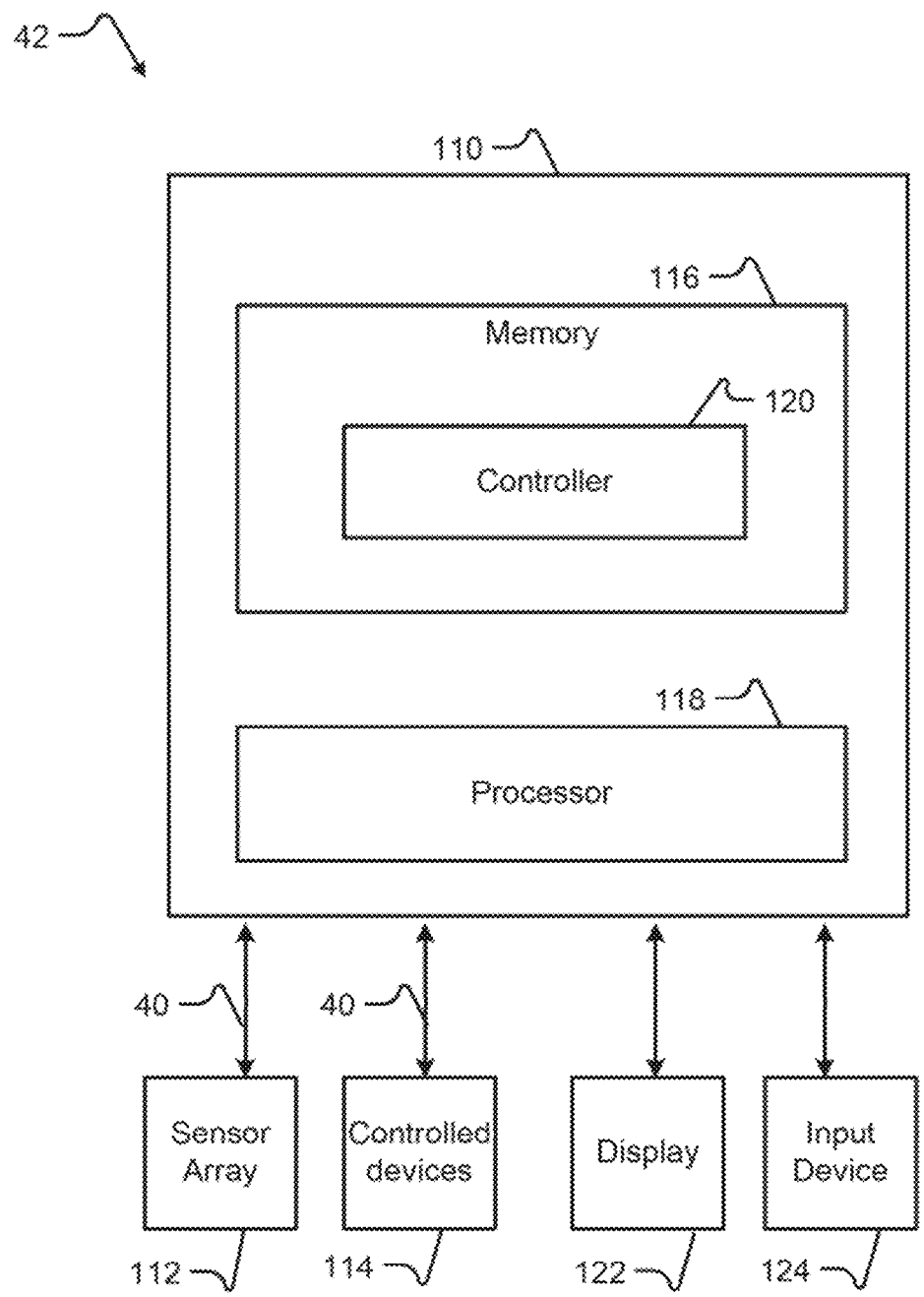
FIG. 5 is a block diagram of a system controller according to an embodiment of the present invention.

Referring now to FIG. 5, a system controller 42 for use with various embodiments of the present invention is illustrated. The system controller 42 includes a computer 110. The computer 110 may be a general purpose personal computer (including, merely by way of example, personal computers and/or laptop computers running various versions of Microsoft Corp.'s Windows™ and/or Apple Corp.'s Macintosh™ operating systems) and/or a workstation computer running any of a variety of commercially-available UNIX™ or UNIX-like operating systems. The computer 110 may also have any of a variety of applications, including for example, database client and/or server applications, and web browser applications. Alternatively, the computer 110 may be any other electronic device, such as a thin-client computer, laptop, Internet-enabled mobile telephone or smartphone, and/or tablet computer.

The computer 110 is in signal communication via connections 40 with a sensor array 112 and controlled devices 114. The computer 110 may receive and process information from components of the sensor array 112 and the controlled devices 114. The sensor array 112 includes the liquid/gas sensing instrument 12, mass flow controller 32, load cells 38, position sensors 46, liquid CO2 sensor 59, and other sensors including pressure sensors, flow rate sensors, thermometers, moisture indicators, timers, etc. Controlled devices 114 are any devices having an operation or feature controlled by the computer 110 including the mixers 8, tank isolation valve 10, liquid/gas sensing valve 12, automated injection valve 14, the injection assembly 16, injectors 17, system shut-off valves 20, pressure reducing valves 22, gas purifiers 24, valves 30, mass flow controllers 32, sensors 46, control valve 56, valve 56A, and the liquid-gas separator 58. Controlled devices also include conveyors, belts, pipes, or valves that transport the concrete materials to the mixer and load the concrete materials into the mixer. The computer 110 generates signals to actuate or control the controlled devices 114. The computer 110 generally comprises a software-controlled device that includes, in memory 116, a number of modules executable by one or more processors 118. The executable modules include a controller 120 to receive and process signals from the sensor array 112 and generate and transmit appropriate commands to the controlled device 114.

A user interacts with the control system 42 through any means known to those skilled in the art, including a display 122 and an input device 124 such as a keyboard, mouse, or other pointer, and/or gestures captured through gesture capture sensors or surfaces, such as a touch sensitive display on a handheld or portable device 50. The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims.

What is claimed is:

1. A method for carbonating a concrete mix in a mixer comprising
    (i) producing carbonated mix water by injecting carbon dioxide into water to be used in the production of the concrete mix; and
    (ii) after producing the carbonated mix water, combining the carbonated mix water with concrete materials comprising cementitious material comprising hydraulic cement and aggregates to produce a carbonated concrete mix,
    wherein the carbonated water provides carbon dioxide to the concrete mix in an amount from 1 to 27 pounds of carbon dioxide per cubic yard of concrete mix, and wherein the mixer is a truck mounted mixer that is open to the atmosphere.

2. The method of claim 1 wherein the carbonated mix water comprises effluent water from a direct hydrocarbon fired heater.

3. The method of claim 1 wherein the concrete mix further comprises cementitious material other than hydraulic cement.

4. The method of claim 3 wherein the other cementitious material comprises fly ash or blast furnace slag, or a combination thereof.

5. The method of claim 1 further comprising converting liquid carbon dioxide to solid and gaseous carbon dioxide and mixing the gaseous and solid carbon dioxide with the concrete mix.

6. The method of claim 1 further comprising adding an admixture to the concrete mix.

* * * * *